United States Patent
Byun et al.

(10) Patent No.: US 11,912,803 B2
(45) Date of Patent: Feb. 27, 2024

(54) CONJUGATED POLYELECTROLYTE-GRAFTED MEMBRANE AND METHOD FOR MANUFACTURING THE SAME

(71) Applicant: KOREA INSTITUTE OF SCIENCE AND TECHNOLOGY, Seoul (KR)

(72) Inventors: Jee Hye Byun, Seoul (KR); Eunhoo Jeong, Seoul (KR); Seok Won Hong, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 157 days.

(21) Appl. No.: 17/103,381

(22) Filed: Nov. 24, 2020

(65) Prior Publication Data

US 2022/0135722 A1 May 5, 2022

(30) Foreign Application Priority Data

Nov. 3, 2020 (KR) .................. 10-2020-0145251

(51) Int. Cl.
  *C08F 259/08* (2006.01)
  *B01D 71/34* (2006.01)
  (Continued)

(52) U.S. Cl.
  CPC .......... *C08F 259/08* (2013.01); *B01D 65/08* (2013.01); *B01D 67/0095* (2013.01);
  (Continued)

(58) Field of Classification Search
  CPC ... C08F 259/08; B01D 65/08; B01D 67/0093; B01D 67/0095; B01D 69/125;
  (Continued)

(56) References Cited

U.S. PATENT DOCUMENTS 9,687,840 B2 * 6/2017 Gin .................. C08G 59/5006
9,969,823 B1 * 5/2018 Luebke ............... C07D 249/06
(Continued)

FOREIGN PATENT DOCUMENTS

KR  10-0503233 B1  7/2005
KR  10-0643096 B1  11/2006
(Continued)

OTHER PUBLICATIONS

Zhu et. al, Superhydrophilic In-Situ-Cross-Linked Zwitterionic Polyelectrolyte/PVDF-Blend Membrane for Highly Efficient Oil/Water Emulsion. 2017, ACS APpl. Mater. Interfaces, 2017, 9, 11, 9603-9613 (Year: 2017).*
(Continued)

*Primary Examiner* — Bradley R Spies
*Assistant Examiner* — Jeannie McDermott
(74) *Attorney, Agent, or Firm* — Birch, Stewart, Kolasch & Birch, LLP

(57) ABSTRACT

The present disclosure relates to a conjugated polyelectrolyte-grafted membrane, which is obtained by fixing a conjugated polyelectrolyte (CPE) capable of generating active oxygen under visible light irradiation to a membrane through crosslinking, and can remove contaminants in water, while reducing bio-fouling on the surface of the membrane, by generating active oxygen through a photocatalytic reaction of the conjugated polyelectrolyte (CPE), as well as to a method for manufacturing the same. The method for manufacturing a conjugated polyelectrolyte-grafted membrane includes the steps of: preparing a conjugated polyelectrolyte (CPE); coating a conjugated polyelectrolyte (CPE) on the surface of a membrane; and carrying out crosslinking of the conjugated polyelectrolyte (CPE) with the surface of the membrane.

9 Claims, 16 Drawing Sheets

(51) Int. Cl.
  *B01D 69/12* (2006.01)
  *B01D 67/00* (2006.01)
  *B01D 65/08* (2006.01)
  *C02F 1/44* (2023.01)
  *C08J 5/22* (2006.01)
  *C02F 101/30* (2006.01)
  *C02F 101/20* (2006.01)

(52) U.S. Cl.
  CPC ..... *B01D 67/00931* (2022.08); *B01D 69/125* (2013.01); *B01D 71/34* (2013.01); *C02F 1/44* (2013.01); *C08J 5/2293* (2013.01); *B01D 2321/168* (2013.01); *B01D 2323/30* (2013.01); *B01D 2323/36* (2013.01); *C02F 2101/20* (2013.01); *C02F 2101/308* (2013.01); *C02F 2303/04* (2013.01); *C02F 2303/20* (2013.01); *C08J 2351/00* (2013.01)

(58) Field of Classification Search
  CPC .............. B01D 71/34; B01D 2321/168; B01D 2323/30; B01D 2323/36; B01D 2323/38; B01D 2325/18; B01D 67/0006; B01D 2325/42; B01D 69/02; C02F 1/44; C02F 2101/20; C02F 2101/308; C02F 2303/04; C02F 2303/20; C08J 5/2293; C08J 2351/00
  See application file for complete search history.

(56) References Cited

U.S. PATENT DOCUMENTS

| | | | | |
|---|---|---|---|---|
| 2011/0082222 A1* | 4/2011 | Ziser | .................. | H01M 8/1025 521/38 |
| 2011/0159605 A1* | 6/2011 | Whitten | ............... | C07K 1/1077 521/38 |
| 2011/0236295 A1* | 9/2011 | Anderson | .......... | B01J 20/28042 526/263 |
| 2016/0222150 A1* | 8/2016 | Whitten | ............... | C07D 233/64 |
| 2022/0220280 A1* | 7/2022 | Kobilka | ................. | C08K 5/092 |

FOREIGN PATENT DOCUMENTS

| | | |
|---|---|---|
| KR | 10-0886906 B1 | 3/2009 |
| KR | 10-1370006 B1 | 3/2014 |
| KR | 10-2016-0009893 A | 1/2016 |

OTHER PUBLICATIONS

Yuan, et al, A Scalable Method toward Superhydrophilic and Underwater Superoleophobic PVDF Membranes for Effective Oil/Water Emulsion Separation, ACS Appl. Mater. Interfaces 2015, 7, 27, 14896-14904 (Year: 2015).*

Ghasimi, S., Prescher, S., Wang, Z.J., Landfester, K., Yuan, J. and Zhang, K.A.I. (2015), Heterophase Photocatalysts from Water-Soluble Conjugated Polyelectrolytes: An Example of Self-Initiation under Visible Light. Angew. Chem. Int. Ed., 54: 14549-14553. https://doi.org/10.1002/anie.201505325 (Year: 2015).*

Byun et al., "Conjugated Polymer Hydrogel Photocatalysts with Expandable Photoactive Sites in Water", Chemistry of Materials, 2019, vol. 31, pp. 3381-3387.

Ghasimi et al., "Heterophase Photocatalysts from Water-Soluble Conjugated Poly-electrolytes: An Example of Self-Initiation under Visible Light", Photocatalysts, Angewandte Chemie International Edition, 2015, vol. 54, pp. 14549-14553.

Cartwright et al., "Impact of fluorine substitution upon the photovoltaic properties of benzothiadiazole-fluorene alternate copolymers," RCS Adv. (2015), vol. 5, pp. 46386-46394.

Lu et al., "$TiO_2$-incorporated polyelectrolyte composite membrane with transformable hydrophilicity/hydrophobicity for nanofiltration separation," Chinese Journal of Chemical Engineering (2020), vol. 28, pp. 2533-2541.

Reis et al., "Amine enrichment of thin-film composite membranes via low pressure plasma for anti-microbial adhesion," ACS Appl. Mater. Interfaces, Jun. 17, 2015, pp. 1-34.

* cited by examiner

CONJUGATED POLYELECTROLYTE-GRAFTED MEMBRANE AND METHOD FOR MANUFACTURING THE SAME

CROSS-REFERENCE TO RELATED APPLICATION

This application claims the priority of Korean Patent Application No. 10-2020-0145251 filed on Nov. 3, 2020, and all the benefits accruing therefrom under 35 U.S.C. § 119, the contents of which in its entirety are herein incorporated by reference.

TECHNICAL FIELD

The present disclosure relates to a conjugated polyelectrolyte-grafted membrane and a method for manufacturing the same. More particularly, the present disclosure relates to a conjugated polyelectrolyte-grafted membrane, which is obtained by fixing a conjugated polyelectrolyte (CPE) capable of generating active oxygen under visible light irradiation to a membrane through crosslinking, and can remove contaminants in water, while reducing bio-fouling on the surface of the membrane, by generating active oxygen through a photocatalytic reaction of the conjugated polyelectrolyte (CPE), and to a method for manufacturing the same.

BACKGROUND ART

Water treatment processes using a membrane have been used widely, since they require low energy consumption and can separate and remove contaminants selectively depending on the pore size of the membrane. While a water treatment process using a membrane is carried out, microorganisms may block the pores of the membrane to cause degradation of the performance thereof, when crude water includes microorganisms. Therefore, a step of cleaning the membrane is applied periodically. However, this may cause damages upon the membrane due to the use of chemicals and requires high Cost.

Methods for fixing a photocatalyst to a membrane have been suggested to increase water treatment efficiency as well as to prevent contamination of the membrane. For example, as a method for fixing titanium dioxide particles to a substrate, Korean Patent Publication No. 0503233 discloses 'Method for Manufacturing Membrane and Water Treatment System Using the Same', Korean Patent Publication No. 0643096 discloses 'Method for Manufacturing Titanium Dioxide Nanostructures Using Polycarbonate Membrane and Titanium Dioxide Nanostructures for Photocatalyst Obtained Thereby', and Korean Patent Publication No. 0886906 discloses 'Method for Manufacturing Titanium Membrane Provided with Nanoporous Photocatalytic Titania Surface'.

The present applicant has also suggested a method for fixing titanium nanostructures on a membrane through hot pressing (see, Korean Patent Publication No. 10-1370006) and a method for fixing titanium dioxide nanoparticles to a PVDF nanofiber layer through electrospinning (Korean Patent Laid-Open No. 10-2016-9893).

As described above, titanium dioxide has been fixed on a membrane as a typical photocatalyst. However, there are problems in that titanium dioxide particles fixed on a membrane may be detached after long-term use and titanium dioxide particles block the pores of the membrane. In addition, since titanium dioxide particles absorb only the ultraviolet rays, an additional UV irradiation device is required, which is not preferred in terms of cost-efficiency.

DISCLOSURE

Technical Problem

A technical problem to be solved by the present disclosure is to provide a conjugated polyelectrolyte-grafted membrane, which is obtained by fixing a conjugated polyelectrolyte (CPE) capable of generating active oxygen under visible light irradiation to a membrane through crosslinking, and can remove contaminants in water, while reducing bio-fouling on the surface of the membrane, by generating active oxygen through a photocatalytic reaction of the conjugated polyelectrolyte (CPE), and to a method for manufacturing the same.

Technical Solution

In one general aspect, there is provided a conjugated polyelectrolyte-grafted membrane including: a membrane; and a conjugated polyelectrolyte (CPE) crosslinked to the surface of the membrane.

The conjugated polyelectrolyte (CPE) is capable of generating active oxygen in water under visible light irradiation.

The conjugated polyelectrolyte (CPE) has visible light absorbing ability, and has a reduction potential of −0.57V vs. SCE (standard calomel electrode) or higher. In addition, a material containing a crosslinkable functional group is introduced to the side chain of the conjugated polyelectrolyte (CPE).

The crosslinkable functional group is an alkene group $(C_nH_{2n})$.

The material containing a crosslinkable functional group is 1-vinylimidazole.

The material containing a crosslinkable functional group is any one selected from 2-vinylimidazole, 4-vinylimidazole, 4-ethenyl-N,N-dimethylbenzenemethaneamine and N,N-dimethylethenamine.

The alkene group $(C_nH_{2n})$ of the conjugated polyelectrolyte (CPE) and the alkene group $(C_nH_{2n})$ of the surface of the membrane form crosslinking through free radical polymerization.

The conjugated polyelectrolyte (CPE) is present in the form of coating on the whole surface of the membrane.

The surface of the membrane has hydrophilicity by a hydroxide ion ($OH^-$) present in the side chain of the conjugated polyelectrolyte (CPE), and the hydroxide ion ($OH^-$) substitutes for the halide ion present in the side chain of the conjugated polyelectrolyte (CPE).

The side chain of the conjugated polyelectrolyte (CPE) has acetate ($CH_3COO^-$) or bis(trifluoromethanesulfonyl)imide (($CF_3SO_2)_2N^-$), and the acetate ($CH_3COO^-$) or bis(trifluoromethanesulfonyl)imide (($CF_3SO_2)_2N^-$) substitutes for the halide ion present in the side chain of the conjugated polyelectrolyte (CPE).

The membrane is applied to separation of contaminants in a water treatment process, and a polymeric membrane capable of crosslinking with a conjugated polyelectrolyte (CPE) may be used. In addition, the membrane may be made of a PVDF-based material.

The membrane may be a photocatalytic membrane.

In another general aspect, there is provided a method for manufacturing a conjugated polyelectrolyte-grafted membrane, including the steps of: preparing a conjugated polyelectrolyte (CPE); coating the conjugated polyelectrolyte (CPE) on the surface of a membrane; and carrying out crosslinking of the conjugated polyelectrolyte (CPE) with the surface of the membrane.

The method may further include a step of substituting the halide ion of the conjugated polyelectrolyte (CPE) crosslinked to the surface of the membrane with a hydroxide ion (OH$^-$).

The method may further include a step of substituting the halide ion of the conjugated polyelectrolyte (CPE) crosslinked to the surface of the membrane with acetate ($CH_3COO^-$) or bis(trifluoromethanesulfonyl)imide (($CF_3SO_2)_2N^-$).

Before the step of coating the conjugated polyelectrolyte (CPE) on the surface of the membrane, an alkene group ($C_nH_{2n}$) may be formed on the surface of the membrane.

The membrane may be dipped in a mixed solution containing an alkaline solution and ethanol to form an alkene group ($C_nH_{2n}$) and hydroxyl group (OH$^-$) on the surface of the membrane.

In the step of carrying out crosslinking of the conjugated polyelectrolyte (CPE) with the surface of the membrane, the alkene group ($C_nH_{2n}$) of the conjugated polyelectrolyte (CPE) is crosslinked with the alkene group ($C_nH_{2n}$) of the surface of the membrane.

In the step of carrying out crosslinking of the conjugated polyelectrolyte (CPE) with the surface of the membrane, the conjugated polyelectrolyte (CPE) is fixed to the surface of the membrane through self-crosslinking of the alkene groups ($C_nH_{2n}$) of the conjugated polyelectrolyte (CPE).

The step of coating the conjugated polyelectrolyte (CPE) on the surface of a membrane includes: dipping a membrane in a conjugated polyelectrolyte (CPE) solution containing the conjugated polyelectrolyte (CPE) dissolved therein so that the surface of the membrane may be coated with the conjugated polyelectrolyte (CPE); and drying the membrane coated with the conjugated polyelectrolyte (CPE), and the coating and drying are carried out once or repeated many times.

The step of carrying out crosslinking of the conjugated polyelectrolyte (CPE) with the surface of the membrane is carried out by dipping the membrane coated with the conjugated polyelectrolyte (CPE) in a solution containing an initiator dissolved therein, and heating the resultant mixture at a predetermined temperature to induce crosslinking of the conjugated polyelectrolyte (CPE) with the surface of the membrane.

The step of substituting the anion of the conjugated polyelectrolyte (CPE) crosslinked to the surface of the membrane with a hydroxide ion (OH$^-$) is carried out by dipping the membrane to which the conjugated polyelectrolyte (CPE) is crosslinked in an alkaline solution so that the anion present in the side chain of the conjugated polyelectrolyte (CPE) may be substituted with a hydroxide ion (OH$^-$).

The step of preparing a conjugated polyelectrolyte (CPE) includes: preparing a conjugated polymer (CP) through crosslinking of an electron-donating monomer with an electron-accepting monomer; and introducing a monomer containing a crosslinkable functional group to the side chain of the conjugated polymer (CP) to obtain a conjugated polyelectrolyte (CPE).

The electron-donating monomer is any one selected from fluorene-, carbazole-, thiophene-, benzene- and pyrrole-containing monomers, and the electron-accepting monomer is any one selected from benzothiadiazole-, benzobisthiadiazole-, benzoxadiazole- and triazine-containing monomers.

Advantageous Effects

The conjugated polyelectrolyte-grafted membrane according to an embodiment of the present disclosure and the method for manufacturing the same provide the following effects.

Since the conjugated polyelectrolyte (CPE) is grafted to the surface of the membrane through crosslinking, it is possible to minimize detachment of the conjugated polyelectrolyte as a photocatalyst from the membrane.

In addition, since the anion of the conjugated polyelectrolyte (CPE) is substituted with a hydroxide ion (OH$^-$) and the surface of the membrane has hydrophilicity, it is possible to reduce bio-fouling of the surface of the membrane and to provide photocatalytic effects, such as organic material-decomposing and antibacterial effects, thereby providing improved contaminant removability of the surface of the membrane.

BEST MODE

The present disclosure relates to an organic photocatalyst-grafted membrane for water treatment. According to the present disclosure, it is possible to prevent the photocatalyst from blocking the pores of the membrane or from being detached from the membrane. In addition, it is possible to remove the contaminants on the surface of the membrane effectively through the photocatalytic effects, such as an effect of decomposing organic materials and an antibacterial effect, while reducing bio-fouling caused by the microorganisms on the surface of the membrane through the photocatalytic reaction of the organic photocatalyst by using visible light.

The organic photocatalyst used in the present disclosure is a conjugated polyelectrolyte (CPE) capable of generating active oxygen ($O_2^-$, OH) under visible light irradiation. While an inorganic photocatalyst, titanium dioxide, generates active oxygen only under ultraviolet ray irradiation, the conjugated polyelectrolyte (CPE) used in the present disclosure characteristically generates active oxygen not only under ultraviolet ray irradiation but also under visible light irradiation, and thus it generates active oxygen, even when being exposed to natural light.

The conjugated polyelectrolyte (CPE) used in the present disclosure may be the same as the conjugated polyelectrolyte (CPE) described in the article published by the inventors of the present disclosure in 2019 (see, Non-Patent Document 1-. Byun, K. Landfester, K. A. I. Zhang, Conjugated polymer hydrogel photocatalysts with expandable photoactive sites in water, Chem. Mater. 31 (2019) 3381-3387), but is not limited thereto. It is stated in the article published in 2019 that the conjugated polyelectrolyte (CPE) realizes a photocatalytic property of generating active oxygen under visible light irradiation.

The present disclosure relates to a method for fixing a conjugated polyelectrolyte (CPE) to a membrane through crosslinking by using the conjugated polyelectrolyte (CPE) having a photocatalytic property described in the article published in 2019.

Hereinafter, the conjugated polyelectrolyte-grafted membrane according to an embodiment of the present disclosure and a method for manufacturing the same will be explained in detail with reference to the accompanying drawings.

Figure 1:
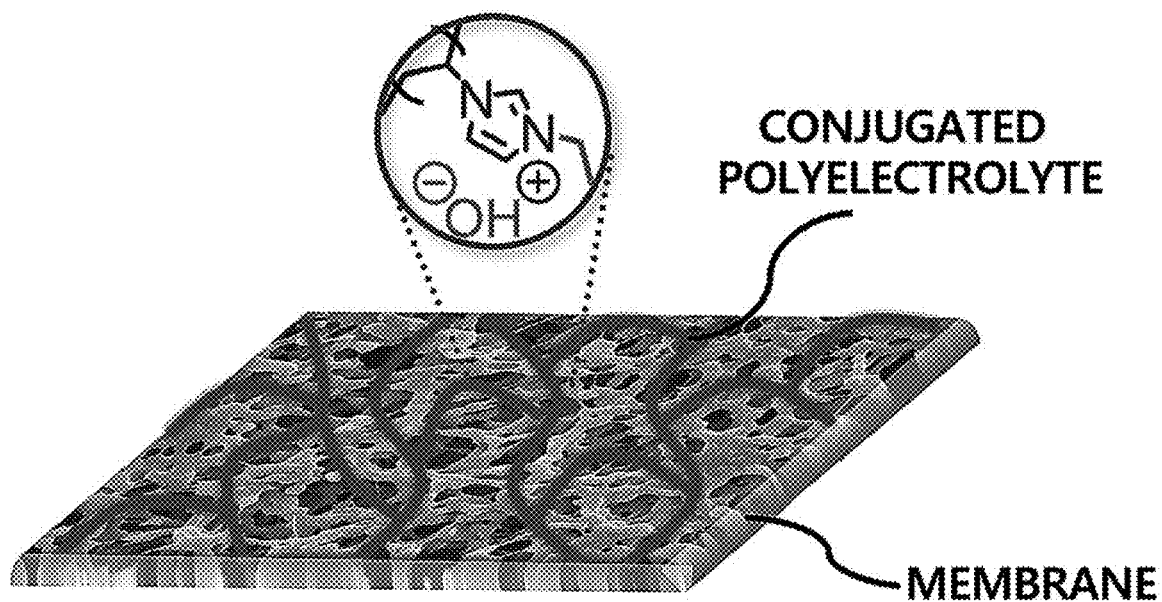
FIG. 1 is a schematic view illustrating the conjugated polyelectrolyte (CPE)-grafted membrane according to an embodiment of the present disclosure.

Referring to FIG. 1, the conjugated polyelectrolyte-grafted membrane includes a conjugated polyelectrolyte (CPE) fixed on the surface of the membrane through crosslinking.

The membrane is used for separation of contaminants in a water treatment process and is provided with a plurality of pores on the surface thereof for the purpose of separation of contaminants. Although a membrane made of PVDF is an embodiment of the present disclosure, any polymeric membrane capable of crosslinking with a conjugated polyelectrolyte (CPE) may be used according to the present disclosure. In addition, even in the case of a membrane incapable of crosslinking with a conjugated polyelectrolyte (CPE), the conjugated polyelectrolyte (CPE) may be fixed to the surface to a certain degree through self-crosslinking, as described hereinafter.

The characteristics of a conjugated polyelectrolyte (CPE) and the crosslinking structure of the conjugated polyelectrolyte (CPE) with a membrane will be explained hereinafter.

In general, a conjugated polyelectrolyte refers to an ionic conjugated polymer including a side chain having an ionic group (cationic or anionic) introduced to a conjugated polymer having a repeated structure of a double bond and a single bond.

The conjugated polyelectrolyte (CPE) used in the present disclosure is a conjugated polyelectrolyte (CPE) including a side chain having a crosslinkable functional group introduced thereto. Herein, the term 'crosslinkable group' present in the side chain of the conjugated polyelectrolyte (CPE) means an alkene group ($C_nH_{2n}$). For example, 1-vinylimidazole may be present in the side chain of the conjugated polyelectrolyte (CPE) as an alkene group ($C_nH_{2n}$)-containing material. As an alkene group ($C_nH_{2n}$)-containing material, any one selected from 2-vinylimidazole, 4-vinylimidazole, 4-ethenyl-N,N-dimethylbenzenemethanamine and N,N-dimethyl-ethenamine may be used, besides 1-vinylimidazole.

Since the conjugated polyelectrolyte (CPE) has a crosslinkable group, i.e., alkene group ($C_nH_{2n}$), formation of an alkene group ($C_nH_{2n}$) on the surface of the membrane allows crosslinking of the alkene group of the conjugated polyelectrolyte (CPE) with the alkene group of the membrane. Herein, the alkene group ($C_nH_{2n}$) as a crosslinkable group of the conjugated polyelectrolyte (CPE) may form self-crosslinking, besides the crosslinking with the alkene group present in the membrane.

According to an embodiment of the present disclosure, a membrane having an alkene group ($C_nH_{2n}$) present on the surface thereof is used and the alkene group ($C_nH_{2n}$) of the conjugated polyelectrolyte (CPE) forms crosslinking with the alkene group ($C_nH_{2n}$) of the surface of the membrane. However, even when the surface of the membrane has no alkene group ($C_nH_{2n}$), the conjugated polyelectrolyte (CPE) may be fixed to the surface of the membrane to a certain degree through the self-crosslinking of the alkene groups ($C_nH_{2n}$) present in the conjugated polyelectrolyte (CPE).

Although the conjugated polyelectrolyte (CPE) may be fixed stably to the surface of the membrane through the crosslinking of the alkene group ($C_nH_{2n}$) of the conjugated polyelectrolyte (CPE) with the alkene group ($C_nH_{2n}$) on the surface of the membrane, the conjugated polyelectrolyte (CPE) may be fixed to the surface of the membrane through the self-crosslinking of the alkene groups ($C_nH_{2n}$) of the conjugated polyelectrolyte (CPE).

Meanwhile, the conjugated polyelectrolyte (CPE) used in the present disclosure includes a conjugated polymer having a band gap of less than 3.18 eV and absorbs visible light (390-700 nm). In addition, the conjugated polyelectrolyte (CPE) used in the present disclosure should satisfy the condition of a reduction potential of –0.57V vs. SCE (saturated calomel electrode) or higher. This is because the conjugated polyelectrolyte generates active oxygen, such as $O_2^-$ and OH, under light irradiation, when the reduction potential is –0.57V vs. SCE or higher. The active oxygen generated through the photocatalytic reaction of the conjugated polyelectrolyte (CPE) shows an effect of decomposing organic materials and an antibacterial effect, and thus decomposes the contaminants on the surface of the membrane and bio-fouling formed on the surface of the membrane.

In brief, the conjugated polyelectrolyte (CPE) used in the present disclosure should satisfy the following conditions: it absorbs visible light, has a crosslinkable group, i.e. alkene group ($C_nH_{2n}$), for the purpose of crosslinking with the surface of the membrane, and shows a reduction potential of −0.57V vs. SCE (saturated calomel electrode) or higher for generating active oxygen through photocatalytic reaction.

The conjugated polyelectrolyte (CPE) satisfying the above conditions may be prepared by the steps of: preparing a conjugated polymer (CP) as shown in the following Reaction Scheme 1; and adding an ionic and crosslinkable monomer to the side alkyl chain to obtain a conjugated polyelectrolyte (CPE) as shown in the following reaction Scheme 2. In Reaction Scheme 1, the backbone of the conjugated polyelectrolyte (CPE), i.e. conjugated polymer (CP), may be formed through the crosslinking of an electron-donating monomer with an electron-accepting monomer by using a metal catalyst. In Reaction Scheme 2, the monomer added to the conjugated polymer (CP) has a crosslinkable group, i.e. alkene group ($C_nH_{2n}$), and shows ionic property, when being bound to the conjugated polymer (CP).

According to an embodiment, the conjugated polyelectrolyte (CPE) may be obtained through the following Reaction Schemes 1 and 2. As shown in Reaction Scheme 1, polymerization of 2,7-dibromo-9,9-bis(6-bromohexyl)fluorene monomer with 2,1,3-benzothiadiazole-4,7-diboronic acid pinacol ester monomer is carried out to obtain a conjugated polymer (CP), and then the conjugated polymer (CP) is allowed to react with 1-vinylimidazole to obtain a conjugated polyelectrolyte (CPE) including 1-vinylimidazole introduced to the side chain of the conjugated polymer (CP).

The reason why 1-vinylimidazole is incorporated to the conjugated polyelectrolyte (CPE) is the presence of an alkene group ($C_nH_{2n}$). The alkene group ($C_nH_{2n}$) contained in 1-vinylimidazole is a crosslinkable group. When an alkene group ($C_nH_{2n}$) is also present on the surface of the membrane, the conjugated polyelectrolyte (CPE) may be crosslinked with the surface of the membrane by means of alkene groups ($C_nH_{2n}$). Referring to the method as described hereinafter, the method includes a step of forming an alkene group ($C_nH_{2n}$) on the surface of the membrane, and a step of crosslinking the alkene group ($C_nH_{2n}$) of the conjugated polyelectrolyte (CPE) with the alkene group ($C_nH_{2n}$) of the surface of the membrane. Herein, the crosslinkable group, alkene group ($C_nH_{2n}$), of the conjugated polyelectrolyte (CPE) may form self-crosslinking, besides the crosslinking with the alkene group ($C_nH_{2n}$) present in the membrane.

With reference to the preparation of a conjugated polymer (CP), polymerization of 2,7-dibromo-9,9-bis(6-bromohexyl)fluorene monomer as an electron-donating monomer, with 2,1,3-benzothiadiazole-4,7-diboronic acid pinacol ester monomer as an electron-accepting monomer may be carried out as mentioned above. Herein, as an electron-donating monomer, any one of carbazole-, thiophene-, benzene- and pyrrole-containing monomers may be used instead of a fluorene-containing monomer. In addition, as an electron-accepting monomer, any one selected from benzothiadiazole-, benzobisthiadiazole-, benzoxadiazole- and triazine-containing monomers may be used instead of a benzothiadiazole-containing monomer.

It is possible to obtain a conjugated polymer (CP) through the crosslinking of an electron-donating monomer with an electron-accepting monomer. However, the side alkyl chain in the electron donor and the electron acceptor should include a halogen element (e.g. Br) in order to obtain an ionic conjugated polymer, i.e. conjugated polyelectrolyte (CPE), through the process of Reaction Scheme 2 after adding 1-vinylimidazole.

In addition, with reference to the preparation of a conjugated polyelectrolyte (CPE), 1-vinylimidazole may be used as a monomer to be added to the halogen element (e.g. Br) contained in the side alkyl chain of the conjugated polymer (CP) for forming an ionic structure as mentioned above. However, 2-vinylimidazole, 4-vinylimidazole, 4-ethenyl-N,N-dimethylbenzenemethaneamine, N,N-dimethylethenamine, or the like may be used, besides 1-vinylimidazole. The monomers are characterized in that they contain a nitrogen atom so that ionic property may be realized, when being added to the side chain, i.e. alkyl halide, of the conjugated polymer (CP), and include a functional group, i.e. alkene group ($C_nH_{2n}$), capable of crosslinking with the surface of the membrane.

[Reaction Scheme 1]

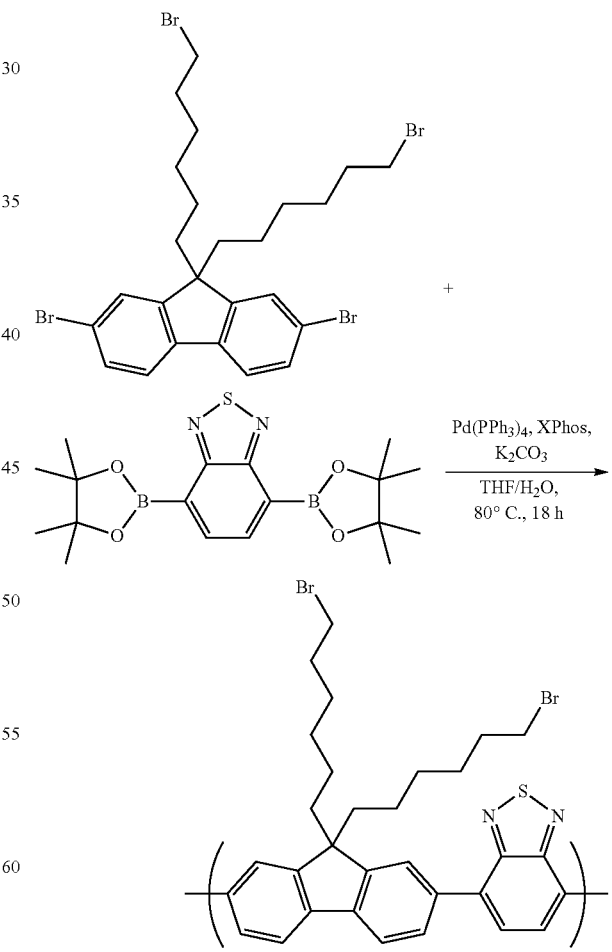

-continued

[Reaction Scheme 2]

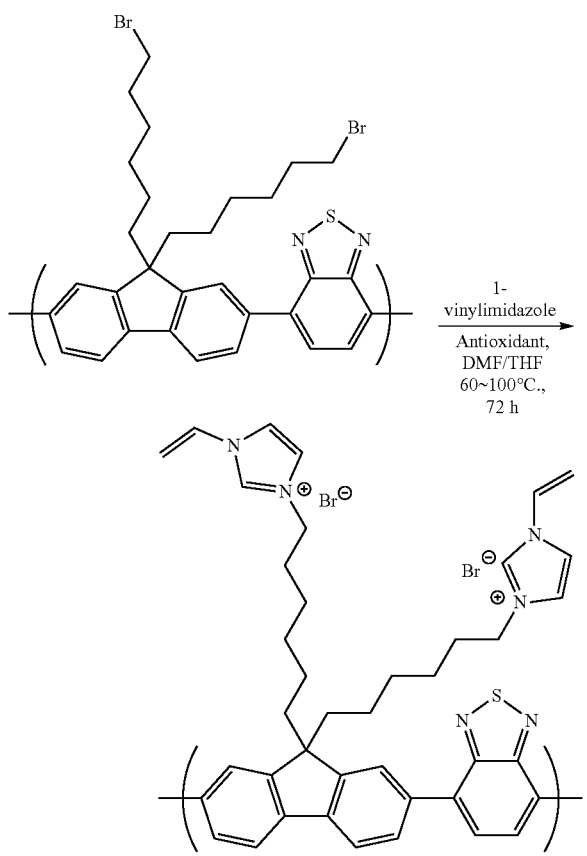

Meanwhile, according to the present disclosure, the conjugated polyelectrolyte (CPE) forms crosslinking with the surface of the membrane through free radical polymerization, while it is coated on the whole surface of the membrane. Herein, while the conjugated polyelectrolyte (CPE) forms crosslinking with the surface of the membrane, the halide ion (e.g. Br⁻) attached to the side chain of the conjugated polyelectrolyte (CPE) is substituted with a hydroxide ion (OH⁻). Such substitution of the halide ion (e.g. Br⁻) attached to the side chain of the conjugated polyelectrolyte (CPE) with a hydroxide ion (OH⁻) may be carried out by dipping the membrane crosslinked with the conjugated polyelectrolyte (CPE) in an alkaline solution, such as KOH or NaOH.

It is possible to reinforce the hydrophilicity of the surface of the membrane through the substitution with a hydroxide ion (OH⁻). When the hydrophilicity of the surface of the membrane is reinforced, contact between the conjugated polyelectrolyte (CPE) and the contaminants in water is enhanced to improve the contaminant decomposition efficiency through photocatalytic reaction.

The surface of the membrane may have enhanced hydrophilicity through the substitution of the halide ion with a hydroxide ion (OH⁻), and the hydrophilicity or hydrophobicity of the surface of the membrane may be controlled depending on particular type of the ion substituting for the halide ion. For example, when the halide ion is substituted with a hydroxide ion (OH⁻), the hydrophilicity of the surface of the membrane is enhanced. On the other hand, when the halide ion is substituted with bis(trifluoromethanesulfonyl)imide, the hydrophobicity of the surface of the membrane is reinforced. Therefore, it is possible to control the hydrophilicity or hydrophobicity of the surface of the membrane selectively by substituting the halide ion with any one of a hydroxide ion (OH⁻), acetate (CH₃COO⁻) and bis(trifluoromethanesulfonyl)imide ((CF₃SO₂)₂N⁻).

As described above, the conjugated polyelectrolyte-grafted membrane according to an embodiment of the present disclosure has a property of absorbing visible light, and shows a reduction potential of −0.57V vs. SCE or higher, wherein the conjugated polyelectrolyte (CPE) having a crosslinkable function group is crosslinked with the surface of the membrane. In addition, since the conjugated polyelectrolyte (CPE) crosslinked with the surface of the membrane has a hydroxide ion (OH⁻), the surface of the membrane has strong hydrophilicity.

Since the conjugated polyelectrolyte (CPE) having a photocatalytic property forms crosslinking with the surface of the membrane, it is possible to prevent the conjugated polyelectrolyte (CPE) from being detached from the membrane. In addition, since the surface of the membrane shows strong hydrophilicity through the hydroxide ion (OH⁻) of the conjugated polyelectrolyte (CPE), contact between the conjugated polyelectrolyte (CPE) and contaminants in water is enhanced so that the reaction between the active oxygen generated through the photocatalytic reaction of the conjugated polyelectrolyte (CPE) and organic contaminants may be accelerated.

Hereinabove, the conjugated polyelectrolyte-grafted membrane according to an embodiment of the present disclosure is described. Hereinafter, the method for manufacturing a conjugated polyelectrolyte-grafted membrane according to an embodiment of the present disclosure will be explained.

Figure 2:
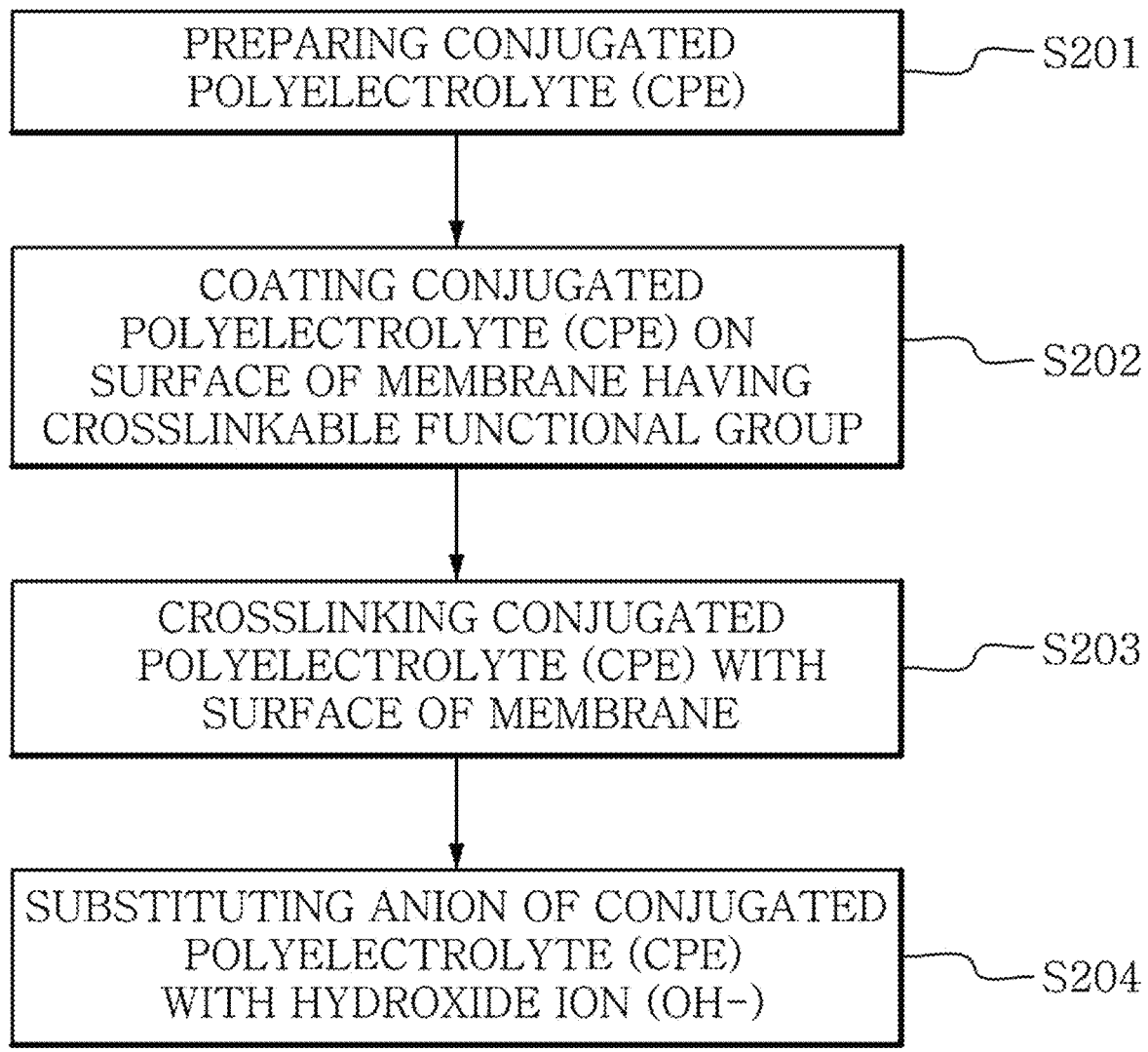
FIG. 2 is a flow chart illustrating the method for manufacturing a conjugated polyelectrolyte (CPE)-grafted membrane according to an embodiment of the present disclosure.

The method for manufacturing a conjugated polyelectrolyte-grafted membrane according to an embodiment of the present disclosure includes the steps of: 1) preparing a conjugated polyelectrolyte (S201), 2) coating the conjugated polyelectrolyte (CPE) on the surface of a membrane (S202), 3) crosslinking the conjugated polyelectrolyte (CPE) with the surface of the membrane (S203), and 4) substituting the anion of the conjugated polyelectrolyte (CPE) with a hydroxide ion (OH⁻) (see, FIG. 2). Each step will be explained in detail hereinafter.

First, step 1) of preparing a conjugated polyelectrolyte (S201) is carried out as follows.

The step of preparing a conjugated polyelectrolyte (CPE) is a step of preparing a conjugated polyelectrolyte (CPE) including a crosslinkable functional group and having a reduction potential capable of generating active oxygen. In addition, the conjugated polyelectrolyte (CPE) has a bandgap with visible light absorbing property.

More particularly, the step of preparing a conjugated polyelectrolyte (CPE) includes preparing a conjugated polymer (CP) and preparing a conjugated polyelectrolyte (CPE).

According to an embodiment, as shown in Reaction Scheme 1, the conjugated polymer (CP) may be prepared by polymerizing 2,7-dibromo-9,9-bis(6-bromohexyl)fluorene monomer as an electron-donating monomer with 2,1,3-benzothiadiazole-4,7-diboronic acid pinacol ester monomer as an electron-accepting monomer. Any one selected from carbazole-, thiophene-, benzene- and pyrrole-containing monomers may be used instead of a fluorene-containing monomer as an electron-donating monomer, any one selected from benzobisthiadiazole-, benzoxadiazole- and triazine-containing monomers may be used instead of a benzothiadiazole-containing monomer as an electron-accepting monomer, and the electron-donating monomer reacts with the electron-accepting monomer to provide a conjugated polymer (CP). The conjugated polymer (CP) shows a semi-conductive property due to the conjugated π bonding, and the photocatalytic property of the conjugated polyelectrolyte (CPE) according to the present disclosure is based on the semi-conductive property.

As mentioned above, the conjugated polyelectrolyte (CPE) according to the present disclosure should have a band gap of less than 3.18 eV so that it may absorb visible light, and have a reduction potential of −0.57V vs. SCE or higher to allow generation of active oxygen. To satisfy this, the starting materials of the conjugated polymer (CP) are limited to the above-listed materials. In other words, cross-linking of an electron-donating monomer with an electron-accepting monomer provides a conjugated polymer (CP), wherein the electron-donating monomer is any one selected from fluorene-, carbazole-, thiophene-, benzene- and pyrrole-containing monomers, and the electron-accepting monomer is any one selected from benzothiadiazole-, benzobisthiadiazole-, benzoxadiazole- and triazine-containing monomers.

The conjugated polyelectrolyte (CPE) is formed by the reaction between the conjugated polymer (CP) and a material containing a crosslinkable functional group. The crosslinkable functional group refers to an alkene group ($C_nH_{2n}$) and reacts with the alkyl halide of the side chain in the conjugated polymer to form an ionic structure, wherein 1-vinylimidazole may be used as a monomer containing an alkene group ($C_nH_{2n}$), as shown in Reaction Scheme 2. Besides 1-vinylimidazole, any one of 2-vinylimidazole, 4-vinylimidazole, 4-ethenyl-N,N-dimethylbenzenemethaneamine and N,N-dimethylethenamine may be used.

The alkene group ($C_nH_{2n}$) contained in 1-vinylimidazole functions as a crosslinkable functional group to form crosslinking with the alkene group ($C_nH_{2n}$) of the surface of the membrane as described hereinafter. In this manner, the conjugated polyelectrolyte (CPE) forms crosslinking with the surface of the membrane by means of the alkene group ($C_nH_{2n}$).

It is possible to obtain a conjugated polyelectrolyte (CPE) having visible light absorbing property, including a crosslinkable functional group and having a reduction potential of −0.57V vs. SCE or higher through the above-described steps of preparing a conjugated polymer (CP) and preparing a conjugated polyelectrolyte (CPE).

After completing the preparation of the conjugated polyelectrolyte (CPE), a step of coating the conjugated polyelectrolyte (CPE) on the surface of a membrane (S202) is carried out.

Particularly, a conjugated polyelectrolyte (CPE) solution, in which the conjugated polyelectrolyte including a crosslinkable functional group is dissolved, is prepared, and a membrane is dipped in the prepared conjugated polyelectrolyte (CPE) solution so that the conjugated polyelectrolyte (CPE) including a crosslinkable functional group may be coated on the surface of the membrane. Then, the membrane coated with the conjugated polyelectrolyte (CPE) including a crosslinkable functional group is dried. Such coating and drying processes may be carried out once to ten times repeatedly.

Herein, before dipping the membrane in the conjugated polyelectrolyte (CPE) solution, it is required to subject the membrane to pretreatment. The key feature of the present disclosure is in crosslinking of the conjugated polyelectrolyte (CPE) with the surface of the membrane. Therefore, in order to form crosslinking of the conjugated polyelectrolyte (CPE) including a crosslinkable functional group, i.e. alkene group ($C_nH_{2n}$), with the surface of the membrane, the surface of the membrane should have a crosslinkable functional group, i.e. alkene group ($C_nH_{2n}$).

Meanwhile, as mentioned above, even when the surface of the membrane has no alkene group ($C_nH_{2n}$), the conjugated polyelectrolyte (CPE) may be fixed to the surface of the membrane to a certain degree through the self-crosslinking of the alkene groups ($C_nH_{2n}$) of the conjugated polyelectrolyte (CPE). However, it is preferred that the alkene group ($C_nH_{2n}$) of the conjugated polyelectrolyte (CPE) is crosslinked with the alkene group ($C_nH_{2n}$) of the surface of the membrane in order to accomplish more stable fixing.

When the surface of the membrane has no alkene group ($C_nH_{2n}$), self-crosslinking of the alkene groups ($C_nH_{2n}$) of the conjugated polyelectrolyte (CPE) may be carried out by crosslinking the alkene groups ($C_nH_{2n}$) of the conjugated polyelectrolyte (CPE) by using an initiator, after carrying out the step of coating the conjugated polyelectrolyte (CPE) on the surface of the membrane (S202).

Therefore, it is required to carry out a step of forming a crosslinking functional group, i.e. alkene group ($C_nH_{2n}$), on the surface of the membrane, before coating the conjugated polyelectrolyte (CPE) on the surface of the membrane. The alkene group ($C_nH_{2n}$) of the surface of the membrane may be formed by treating the surface of the membrane with an alkaline solution. According to an embodiment, when the membrane is dipped and agitated in aqueous solution containing a mixture of ethanol with KOH, an alkene group ($C_nH_{2n}$) and hydroxyl group (—OH) are formed on the surface of the membrane (see, 'AT-PVDF' in FIG. 3).

After the alkene group ($C_nH_{2n}$) is formed on the surface of the membrane, the above-mentioned conjugated polyelectrolyte (CPE) coating and drying steps are carried out (S202).

After the conjugated polyelectrolyte (CPE) is coated on the surface of the membrane having an alkene group ($C_nH_{2n}$) as a crosslinkable functional group, step 3) of crosslinking the conjugated polyelectrolyte (CPE) with the surface of the membrane is carried out (S203).

The crosslinking of the conjugated polyelectrolyte (CPE) with the surface of the membrane refers to crosslinking of the alkene group ($C_nH_{2n}$) present in the conjugated polyelectrolyte (CPE) with the alkene group ($C_nH_{2n}$) present in the surface of the membrane.

According to an embodiment, after the membrane coated with the conjugated polyelectrolyte (CPE) is dipped in THF solution containing a radical initiator dissolved therein, heating is carried out at a predetermined temperature to induce crosslinking between the conjugated polyelectrolyte (CPE) and the surface of the membrane. Herein, the solvent used for the crosslinking is one in which the conjugated polyelectrolyte (CPE) is not dissolved. Typically, tetrahydrofuran (THF) may be used. As a radical initiator, 2,2'-azobis-isobutyronitrile (AIBN), benzoyl peroxide, etc. may be used but the radical initiator is not limited thereto. The reaction temperature varies depending on particular type of radical initiator. When using AIBN, crosslinking is carried out at a temperature of 70° C. or higher. In this manner, the alkene group ($C_nH_{2n}$) present in the side chain of the conjugated polyelectrolyte (CPE) is crosslinked with the alkene group ($C_nH_{2n}$) present in the surface of the membrane (see, 'PM-Br' in FIG. 3).

After the crosslinking is completed, a step of substituting the anion (e.g. $Br^-$) present in the side chain of the conjugated polyelectrolyte (CPE) with a hydroxide ion ($OH^-$) (S204) is carried out finally.

Figure 3:
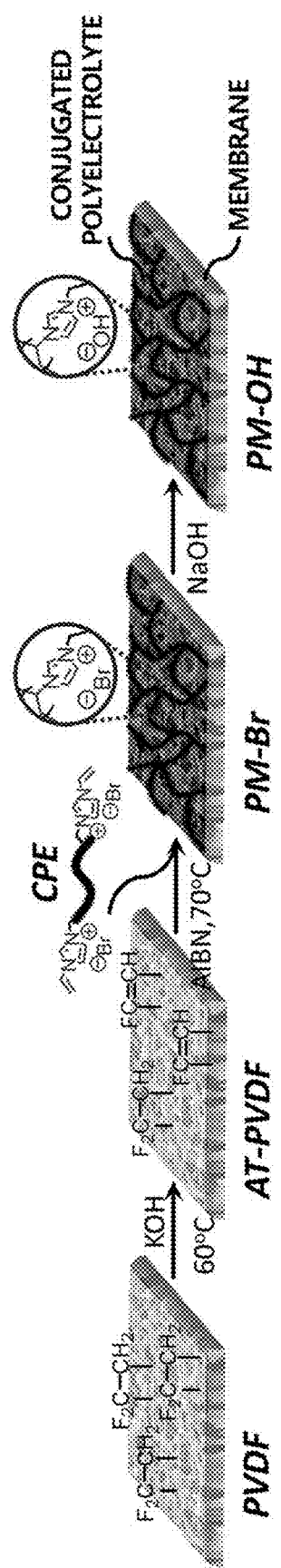
FIG. 3 is a schematic view illustrating the method for manufacturing a conjugated polyelectrolyte (CPE)-grafted membrane according to an embodiment of the present disclosure.

Particularly, after the conjugated polyelectrolyte (CPE) is crosslinked with the surface of the membrane, the membrane is dipped and agitated in NaOH solution so that the halide ion (e.g. Br) present in the side chain of the conjugated polyelectrolyte (CPE) may be substituted with a hydroxide ion ($OH^-$) (see, 'PM-OH' in FIG. 3).

Since the anion present in the side chain of the conjugated polyelectrolyte (CPE) is substituted with a hydroxide ion ($OH^-$), after the conjugated polyelectrolyte (CPE) is coated on the whole surface of the membrane and forms crosslinking therewith, the surface of the membrane shows strong hydrophilicity.

Hereinabove, the conjugated polyelectrolyte-grafted membrane according to an embodiment of the present disclosure and a method for manufacturing the same are described. Hereinafter, the present disclosure will be described in more detail with reference to test examples.

Test Example 1: Preparation of Conjugated Polymer (CP) and Conjugated Polyelectrolyte (CPE)

As starting materials, 2,7-dibromo-9,9-bis(6-bromohexyl)fluorene and 2,1,3-benzothiadiazole-4,7-diboronic acid pinacol ester were used, and a conjugated polymer (CP) was prepared from the starting materials by using the Suzuki coupling method.

Next, the conjugated polymer (CP) was dissolved in 2 mL of THF solution, and the resultant solution was mixed with a mixed solution of 2,6-di-tert-butyl-4-methylphenol (0.25 g), DMF (4 mL) and 1-vinylimidazole (4 mL), followed by agitation. The agitated solution was heated at a temperature of 60° C., 80° C. and 100° C. each for 24 hours to obtain a conjugated polyelectrolyte (CPE).

Test Example 2: Coating and Crosslinking with Conjugated Polyelectrolyte (CPE)

A hydrophobic PVDF membrane (1×1 cm$^2$) was dipped in 10 wt % KOH aqueous solution (with 0.05% EtOH) and agitation was carried out at a temperature of 60° C. for 30 minutes to prepare an AT (alkaline treatment)-PVDF membrane. Then, the AT-PVDF membrane was completely dipped in a conjugated polyelectrolyte (CPE) solution (1 wt % in DMSO) and dried under vacuum. The above procedure was carried out once to five times.

The AT-PVDF membrane coated with the conjugated polyelectrolyte (CPE) was introduced to azobisisobutyronitrile (AIBN) solution (10 µL/mL in THF) and crosslinking was carried out at 70° C. for 24 hours (PM-Br). After completing the crosslinking, the PVDF membrane was introduced to 1M NaOH solution and agitated for 24 hours. The resultant membrane (PM-OH) was washed with ultrapure water and the finished membrane showed an orange color.

Test Example 3: Analysis of Properties of Membrane-Stability, Water Permeability and Antibacterial Property The membrane (PM-OH) obtained from Test Example 2, i.e. the conjugated polyelectrolyte (CPE)-grafted membrane was analyzed in terms of stability, water permeability and antibacterial property.

The membrane (PM-OH) obtained from Test Example 2 was subjected to each of the following conditions and its water permeability and anti-bacterial property were examined: dipping in hydrochloric acid solution for 15 hours (HCl), dipping in water at a temperature of 70° C. for 15 hours (Hot $H_2O$), and ultrasonication (Sonic).

Figure 4:
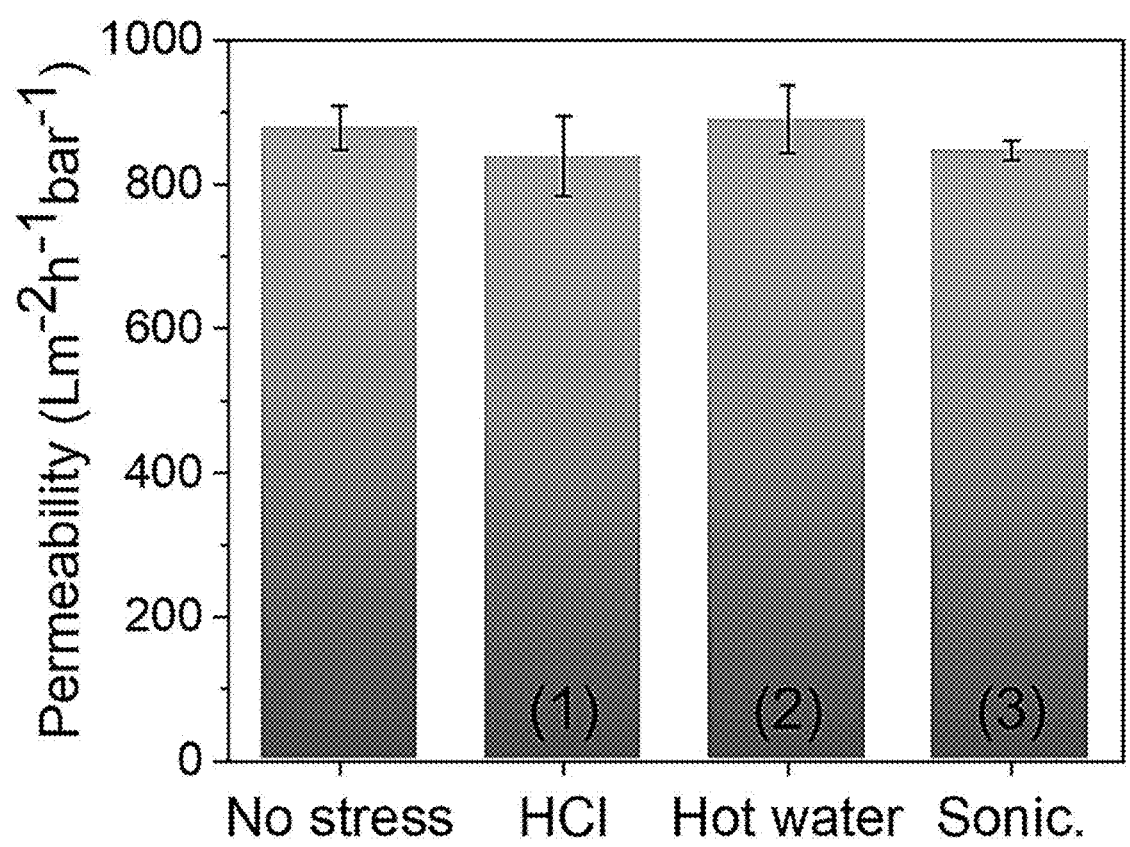
FIG. 4 illustrates the result of a test for determining the water permeability of the membrane (PM-OH) to which each of the conditions according to Test Example 3 is applied.

Referring to FIG. 4, it is shown that application of each of the above conditions causes no significant change, as compared to the membrane (PM-OH) obtained from Test Example 2 and not subjected to any condition (No stress' in FIG. 4).

Figure 5:
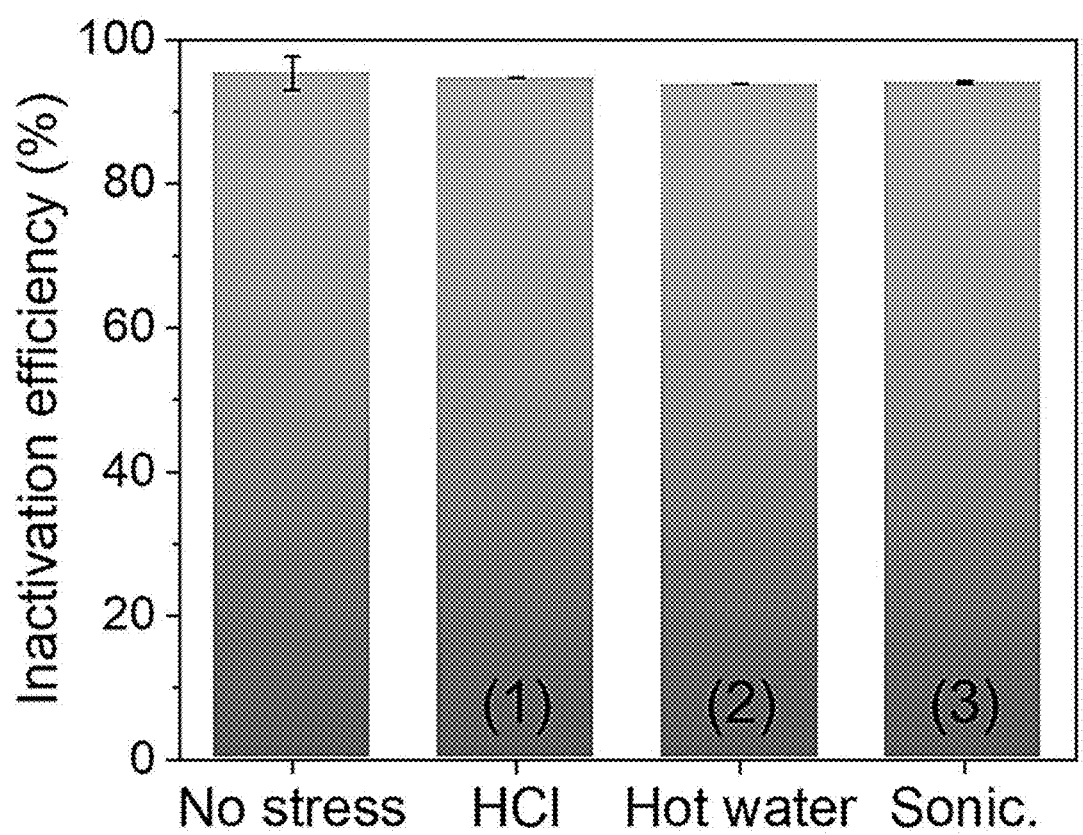
FIG. 5 illustrates the result of a test for determining the antibacterial property of the membrane (PM-OH) to which each of the conditions according to Test Example 3 is applied.

In the case of anti-bacterial property, both the membrane (PM-OH) not subjected to any condition and the membrane subjected to each of the above conditions show an efficiency of removing E. coli of 95% or more, as shown in FIG. 5.

As a comparative membrane (PM-PL), a membrane including a conjugated polyelectrolyte (CPE) stacked physically on a PVDF membrane through depressurization was prepared. In addition, the comparative membrane was determined for water permeability and anti-bacterial property.

Figure 6:
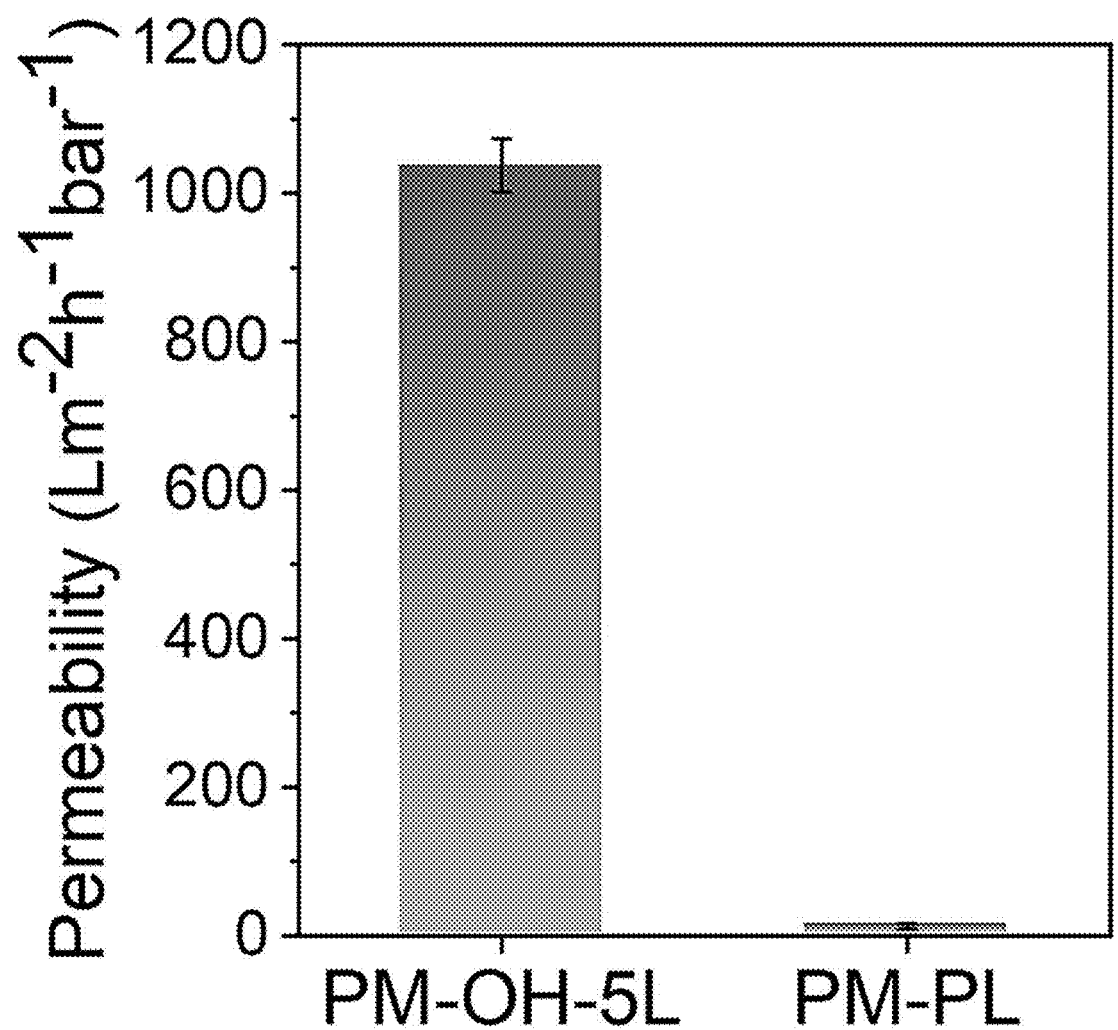
FIG. 6 illustrates the result of a test for determining the water permeability of membrane (PM-OH) and that of a comparative membrane (PM-PL).
Figure 7:
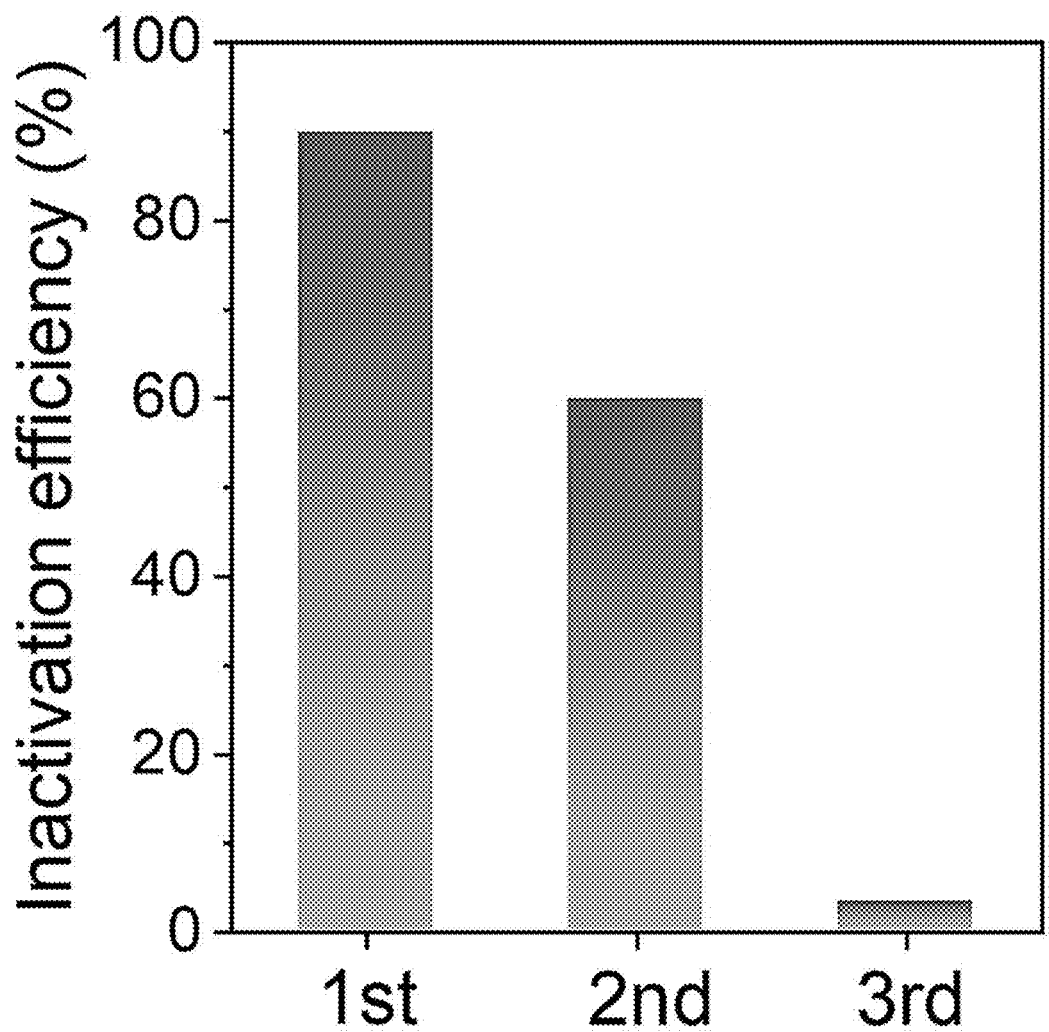
FIG. 7 illustrates the result of a test for determining the antibacterial property of a comparative membrane (PM-PL) depending on number of use.

Referring to FIG. 6, it is shown that while the membrane (PM-OH) obtained from Test Example 2 shows a water permeability of about 1000 $Lm^{-2} h^{-1} bar^{-1}$, the comparative membrane (PM-PL) shows a water permeability of approximately 0. In addition, in the case of the comparative membrane (PM-PL), it can be seen that as the number of use is increased (once to three times), the anti-bacterial property is rapidly degraded due to the detachment of the conjugated polyelectrolyte (CPE) from the surface (see, FIG. 7).

Test Example 4: Analysis of Properties of Membrane-Hydrophilicity and Porosity The membrane (PM-OH) obtained from Test Example 2 was analyzed in terms of hydrophilicity and porosity.

Figure 8:
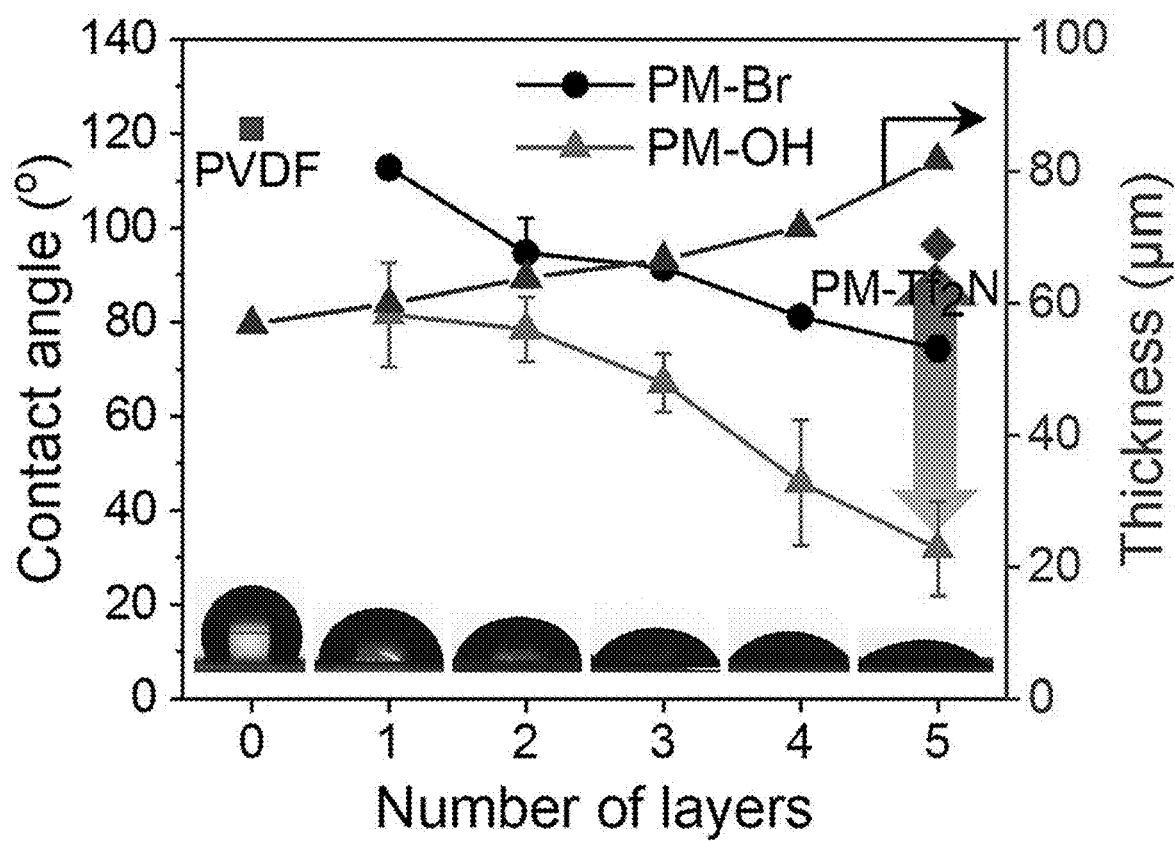
FIG. 8 illustrates the result of a test for determining the contact angle characteristic of a membrane (PM-Br) before substitution with a hydroxide ion (OH—) and that of a membrane (PM-OH) substituted with a hydroxide ion (OH—), depending on number of coating with a conjugated polyelectrolyte (CPE).

When comparing the membrane (PM-Br) before the anion of the conjugated polyelectrolyte (CPE) crosslinked with the surface of the membrane is substituted with a hydroxide ion ($OH^-$) to the membrane (PM-OH) substituted with a hydroxide ion ($OH^-$), it can be seen from FIG. 8 that the contact angle of the membrane substituted with a hydroxide ion ($OH^-$) is reduced, as the number of coating with the conjugated polyelectrolyte (CPE) is increased. It can be also seen that substitution of the anion of the conjugated polyelectrolyte (CPE) with a hydroxide ion ($OH^-$) functions as a factor which increases the hydrophilicity of the surface of the membrane significantly.

Figure 9:
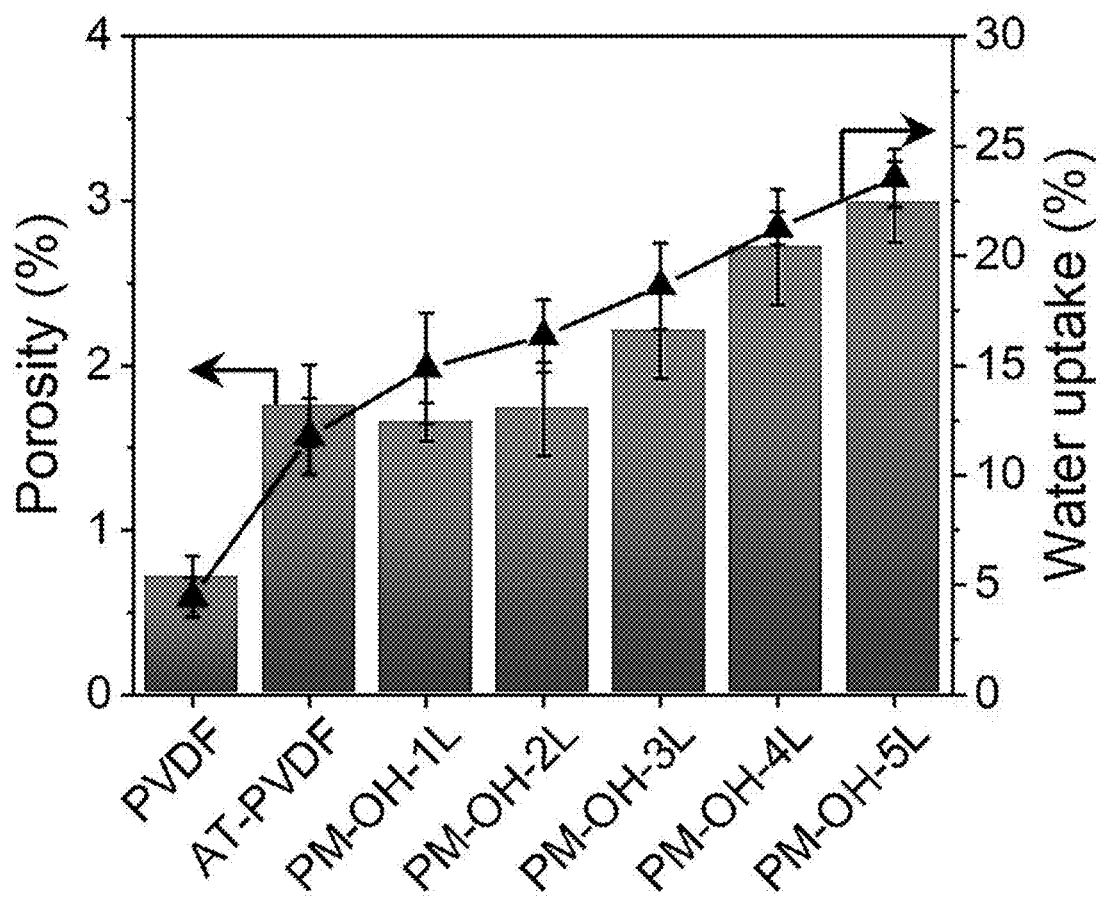
FIG. 9 illustrates the result of a test for determining the porosity characteristic of a membrane (PM-OH) depending on number of coating with a conjugated polyelectrolyte (CPE).
Figure 10:
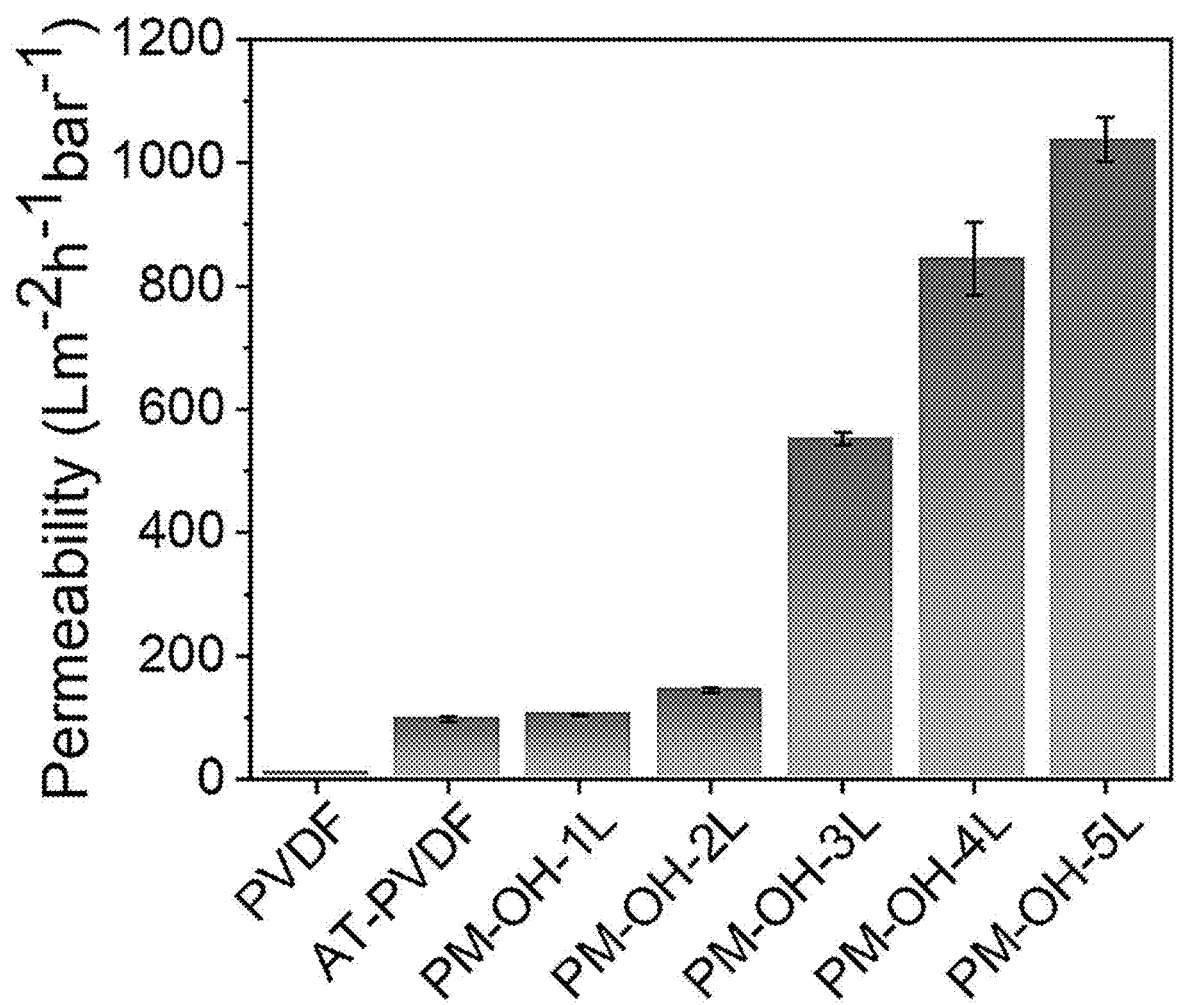
FIG. 10 illustrates the result of a test for determining the water permeability of a membrane (PM-OH) depending on number of coating with a conjugated polyelectrolyte (CPE).

In addition, referring to FIG. 9 and FIG. 10, it can be seen that the porosity and water permeability of the membrane (PM-OH) are improved, as the number of coating with the conjugated polyelectrolyte (CPE) is increased. This is because the surface of the membrane shows higher hydrophilicity, as the number of coating with the conjugated polyelectrolyte (CPE) is increased.

Test Example 5: Analysis of Properties of Membrane-Microorganism Removability Under the irradiation of visible light (λ=490-625 nm, 3 mW/cm$^2$, 1 hour), removability of each of E. coli-, S. aureus- and MS2 bacteriophage was examined.

Figure 11:
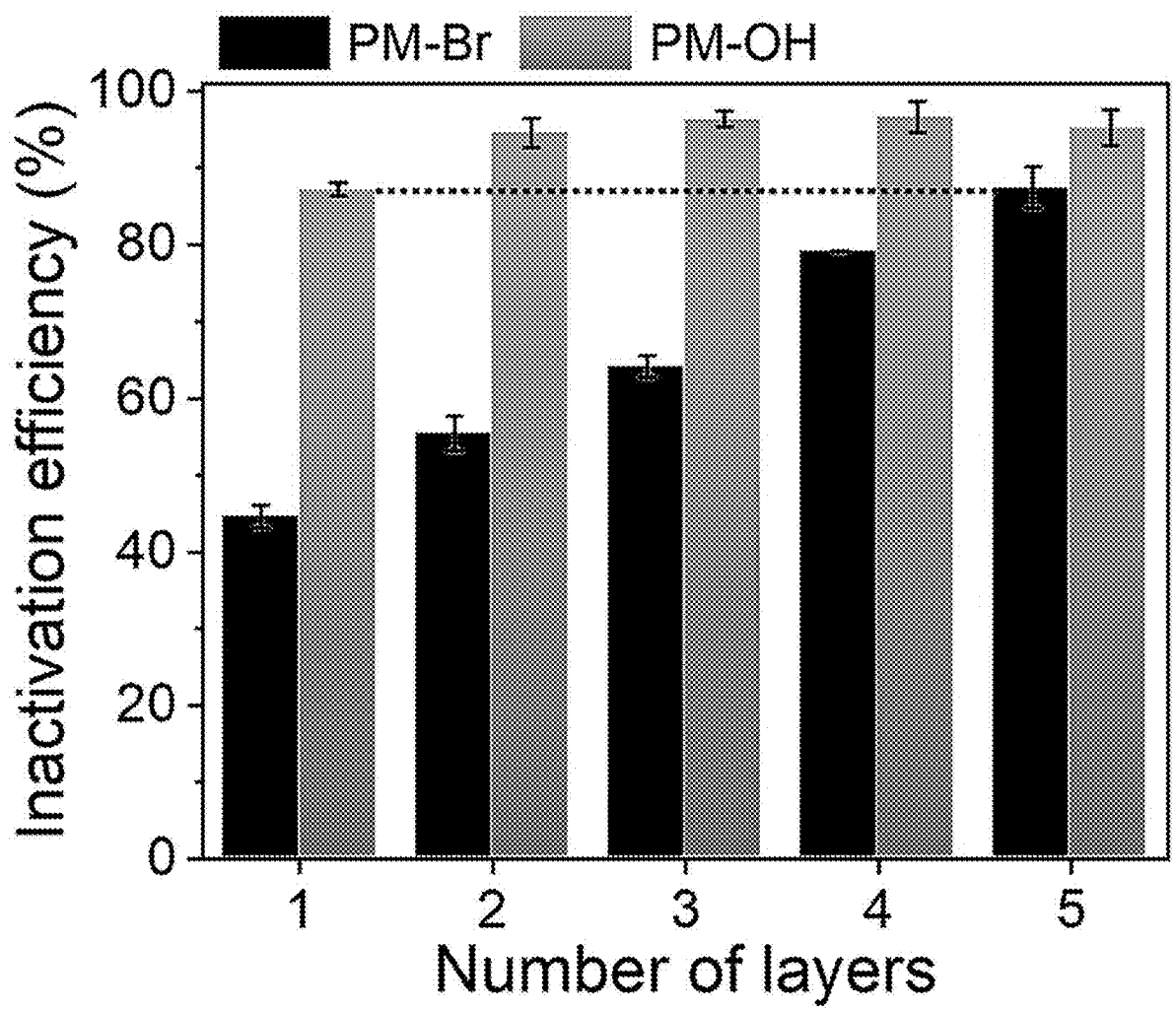
FIG. 11 illustrates the result of a test for determining the microorganism removability of a membrane (PM-Br) before substitution with a hydroxide ion (OH—) and that of a membrane (PM-OH) substituted with a hydroxide ion (OH—).

When comparing the membrane (PM-Br) before being substituted with a hydroxide ion ($OH^-$) to the membrane (PM-OH) substituted with a hydroxide ion ($OH^-$), it can be seen that the membrane (PM-OH) shows significantly higher microorganism removability, as shown in FIG. 11. It is thought that this is because the membrane (PM-OH) has increased hydrophilicity.

Figure 12:
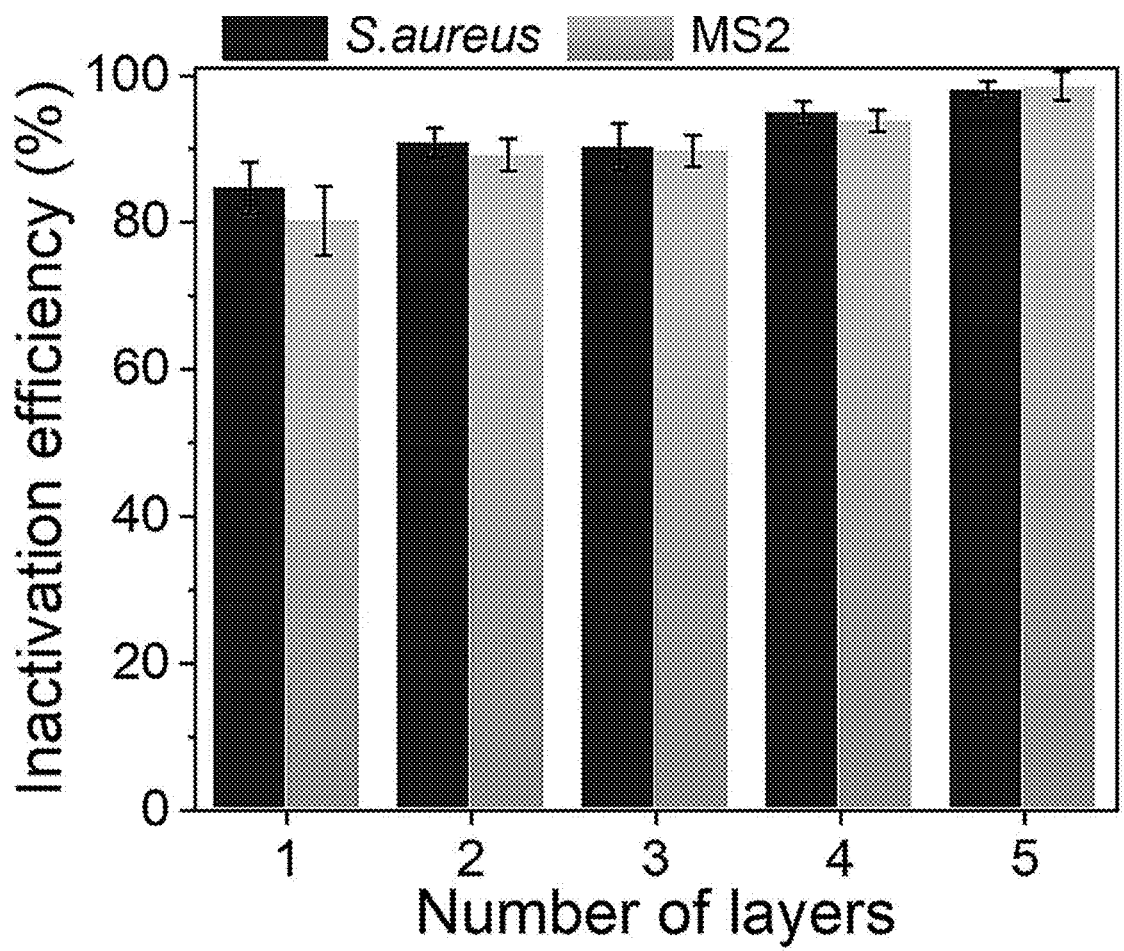
FIG. 12 illustrates the result of a test for determining the microorganism removability of a membrane (PM-OH).
Figure 13:
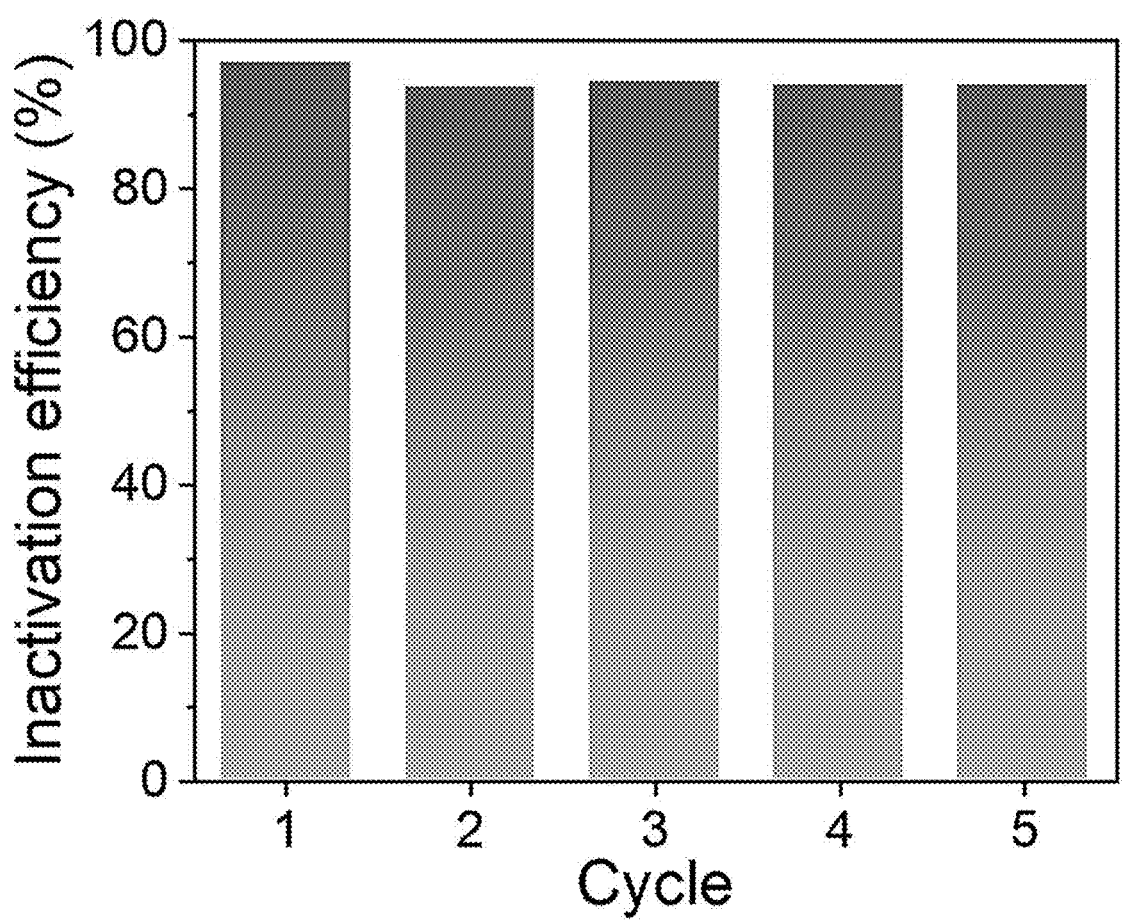
FIG. 13 illustrates the result of a test for determining the antibacterial property of a membrane (PM-OH) depending on number of use.

In addition, referring to FIG. 12, it can be seen that the membrane (PM-OH) shows an efficiency of removing S.

aureus of 98.1% and an efficiency of removing MS2 bacteriophage of 98.6%. Further, it can be seen from FIG. 13 that even when the membrane (PM-OH) is tested five times repeatedly, it shows equivalent antibacterial property.

Test Example 6: Analysis of Properties of Membrane-Removability of Organic Dye and Heavy Metal The membrane (PM-OH) was determined in terms of removability of an organic dye and heavy metal depending on light irradiation.

Figure 14:
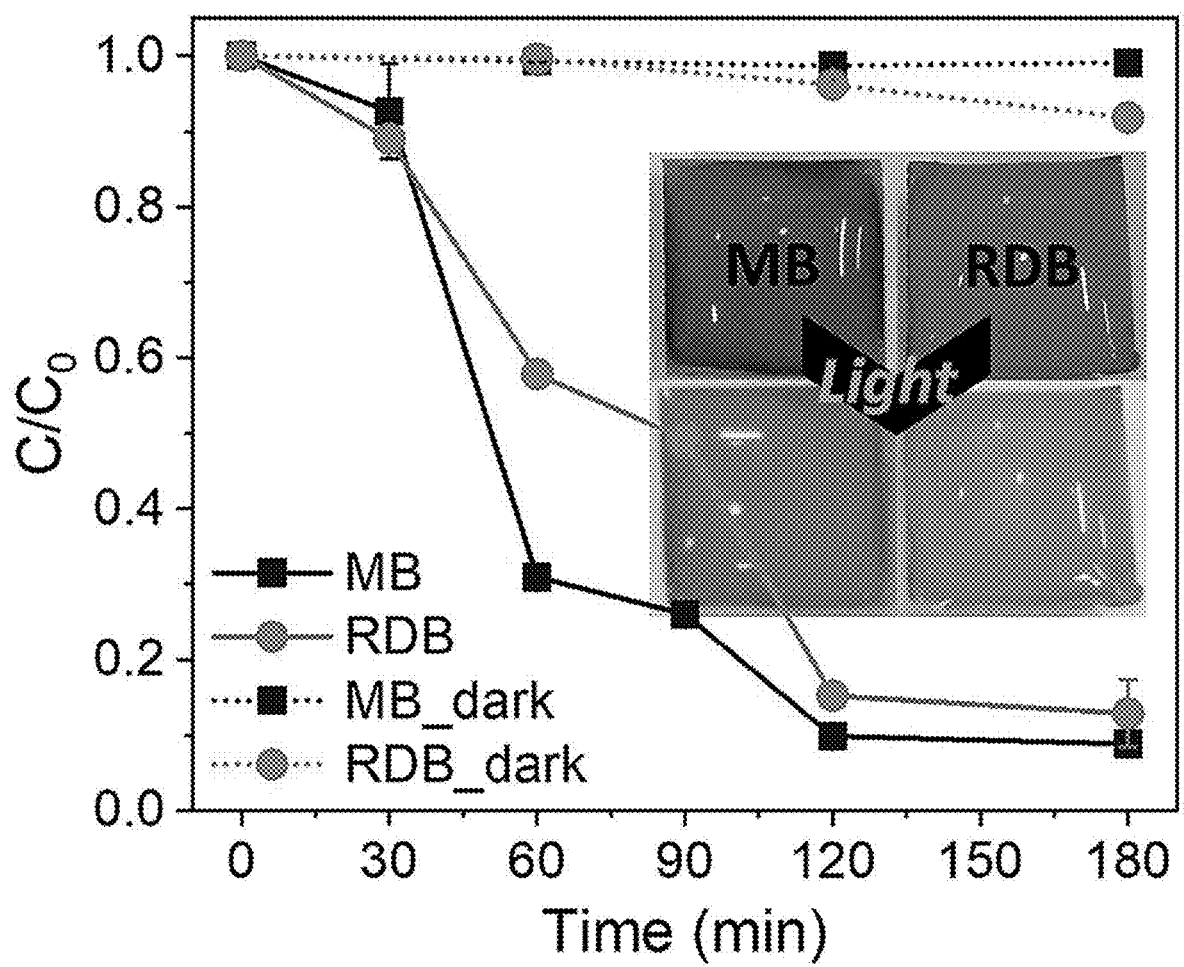
FIG. 14 illustrates the result of a test for determining the organic dye removability of a membrane (PM-OH) depending on light irradiation.

When no light is irradiated, each of methylene blue (MB) removability and rhodamine (RDB) removability is 10% or less. However, when light is irradiated, there are provided a methylene blue (MB) removability of 91.2% and a rhodamine (RDB) removability of 87.1% (see, FIG. 14).

Figure 15:
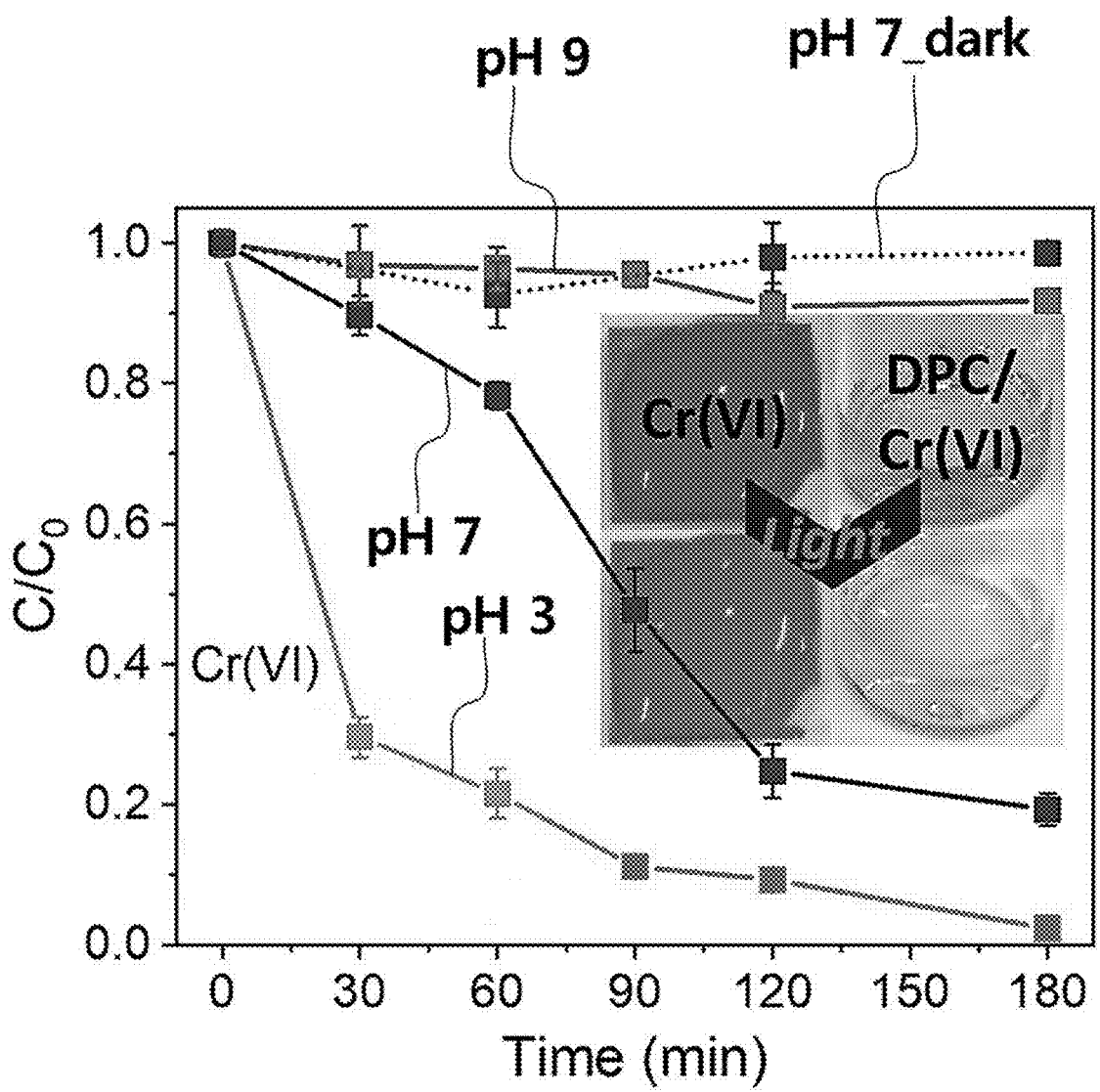
FIG. 15 illustrates the result of a test for determining the heavy metal removability of a membrane (PM-OH) depending on light irradiation.

In the case of a heavy metal, the removability significantly depends on light irradiation. Referring to FIG. 15, when no light is irradiated at pH 7, substantially no heavy metal (Cr(VI)) is removed. On the contrary, when light is irradiated, there is provided a Cr(VI) removability of 80.7%.

Test Example 7: Analysis of Properties of Membrane-Bio-Fouling Removability

The membrane was tested in terms of its water permeability recovery characteristic by using water including each of E. coli and S. aureus at a content of $10^9$ CFU/mL and was repeated three times.

Figure 16:
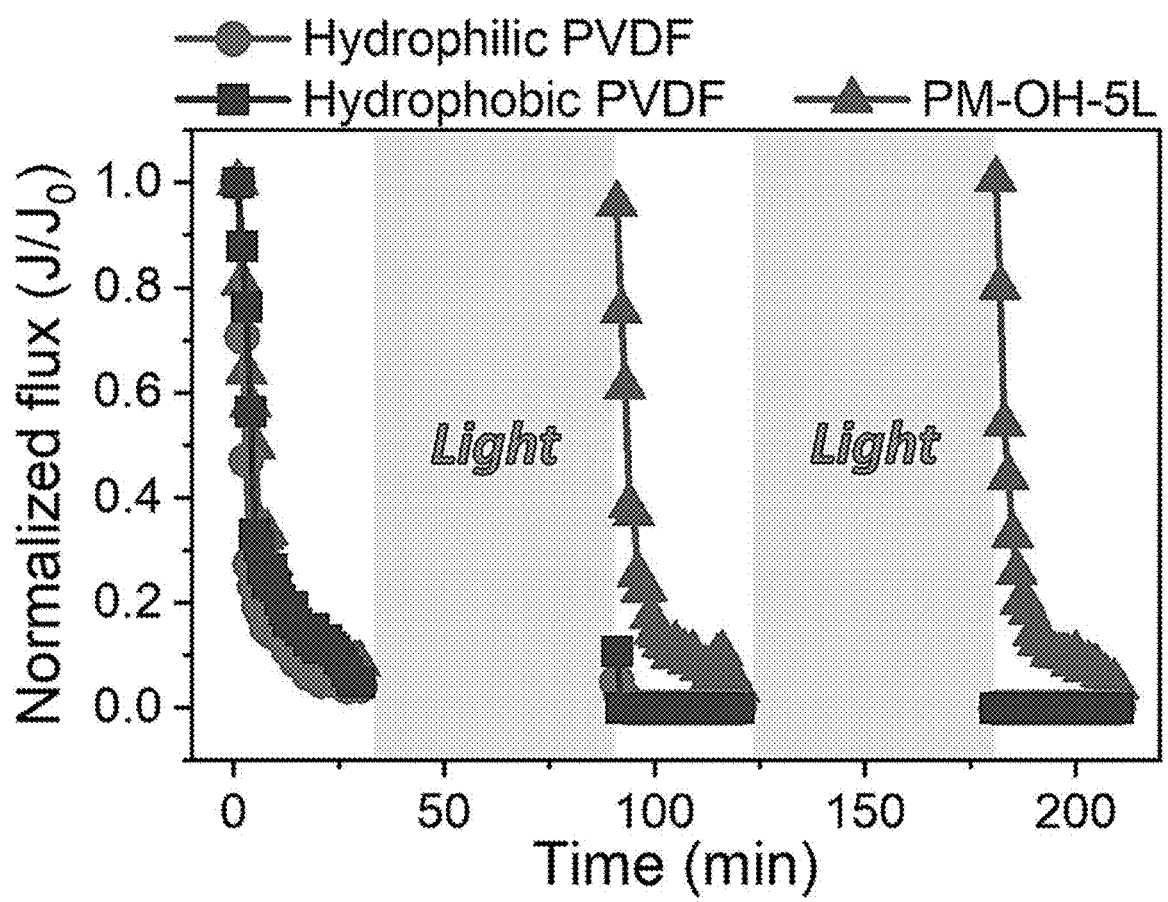
FIG. 16 illustrates the result of a test for determining the water permeability-recovering characteristic of a membrane (PM-OH) depending on light irradiation, according to Test Example 7.

When hydrophilic PVDF and hydrophobic PVDF membranes are used as controls, they undergo a decrease in water permeability to approximately 0, the water permeability cannot be recovered even under visible light irradiation, and they are torn finally. On the contrary, it can be seen that when light is irradiated to the membrane (PM-OH) according to an embodiment of the present disclosure, its water permeability is recovered, which suggests that it has an effect of reducing bio-fouling (see, FIG. 16).

The invention claimed is:

1. A conjugated polyelectrolyte-grafted membrane comprising:
 a membrane; and
 a conjugated polyelectrolyte (CPE) crosslinked to a surface of the membrane;
 wherein an alkene group ($C_nH_{2n}$) of the conjugated polyelectrolyte (CPE) and an alkene group ($C_nH_{2n}$) of the surface of the membrane form crosslinking through free radical polymerization;
 wherein the alkene group ($C_nH_{2n}$) of the conjugated polyelectrolyte (CPE) is 1-vinylimidazole;
 wherein the conjugated polyelectrolyte (CPE) is present in the form of coating on the whole surface of the membrane;
 wherein the surface of the conjugated polyelectrolyte-grafted membrane has hydrophilicity by a hydroxide ion ($OH^-$) present in a side chain of the conjugated polyelectrolyte (CPE), and the hydroxide ion ($OH^-$) substitutes for a halide ion present in the side chain of the conjugated polyelectrolyte (CPE);
 wherein the conjugated polyelectrolyte (CPE) is capable of generating active oxygen in water under visible light irradiation;
 wherein the conjugated polyelectrolyte (CPE) has visible light absorbing ability, and has a reduction potential of −0.57V or higher vs. a standard calomel electrode (SCE);
 wherein the membrane is applied to separation of contaminants in a water treatment process;
 wherein the membrane is a polymeric membrane capable of crosslinking with a conjugated polyelectrolyte (CPE); and
 wherein the membrane is a polyvinylidene fluoride-based (PVDF-based) material.

2. The conjugated polyelectrolyte-grafted membrane according to claim 1, wherein a material containing a crosslinkable functional group is introduced to a side chain of the conjugated polyelectrolyte (CPE).

3. The conjugated polyelectrolyte-grafted membrane according to claim 2, wherein the crosslinkable functional group is an alkene group ($C_nH_{2n}$).

4. The conjugated polyelectrolyte-grafted membrane according to claim 1, wherein a side chain of the conjugated polyelectrolyte (CPE) has acetate ($CH_3COO^-$) or bis(trifluoromethanesulfonyl)imide (($CF_3SO_2)_2N^-$), and the acetate ($CH_3COO^-$) or bis(trifluoromethanesulfonyl)imide (($CF_3SO_2)_2N^-$) substitutes for a halide ion present in the side chain of the conjugated polyelectrolyte (CPE).

5. A method for manufacturing a conjugated polyelectrolyte-grafted membrane, comprising the steps of:
 preparing a conjugated polyelectrolyte (CPE);
 coating the conjugated polyelectrolyte (CPE) on a surface of a membrane, wherein the membrane is a polyvinylidene fluoride-based (PVDF-based) material;
 dipping the membrane in a mixed solution containing an alkaline solution and ethanol to form an alkene group ($C_nH_{2n}$) and hydroxyl group ($OH^-$) on the surface of the membrane;
 carrying out crosslinking of the conjugated polyelectrolyte (CPE) with the surface of the membrane;
 substituting a halide ion of the conjugated polyelectrolyte (CPE) crosslinked to the surface of the membrane with a hydroxide ion ($OH^-$); and
 substituting another halide ion of the conjugated polyelectrolyte (CPE) crosslinked to the surface of the membrane with acetate ($CH_3COO^-$) or bis(trifluoromethanesulfonyl)imide (($CF_3SO_2)_2N^-$);
 wherein a material containing a crosslinkable functional group is introduced to a side chain of the conjugated polyelectrolyte (CPE), in the step of preparing a conjugated polyelectrolyte (CPE), and wherein the crosslinkable functional group is 1-vinylimidazole;
 wherein the conjugated polyelectrolyte (CPE) is capable of generating active oxygen in water under visible light irradiation, in the step of preparing a conjugated polyelectrolyte (CPE);
 wherein the conjugated polyelectrolyte (CPE) has visible light absorbing ability, and has a reduction potential of −0.57V or higher vs. a standard calomel electrode (SCE); and
 wherein the step of carrying out crosslinking of the conjugated polyelectrolyte (CPE) with the surface of the membrane is carried out by dipping the membrane coated with the conjugated polyelectrolyte (CPE) in a solution containing an initiator dissolved therein, and heating the resultant mixture at a predetermined temperature to induce cross linking of the conjugated polyelectrolyte (CPE) with the surface of the membrane.

6. The method for manufacturing a conjugated polyelectrolyte-grafted membrane according to claim 5, wherein the 1-vinylimidazole of the conjugated polyelectrolyte (CPE) is crosslinked with the alkene group ($C_nH_{2n}$) of the surface of the membrane, in the step of carrying out crosslinking of the conjugated polyelectrolyte (CPE) with the surface of the membrane or,
  wherein the conjugated polyelectrolyte (CPE) is fixed to the surface of the membrane through self-crosslinking of the 1-vinylimidazole of the conjugated polyelectrolyte (CPE), in the step of carrying out crosslinking of the conjugated polyelectrolyte (CPE) with the surface of the membrane.

7. The method for manufacturing a conjugated polyelectrolyte-grafted membrane according to claim 5, wherein the step of coating the conjugated polyelectrolyte (CPE) on the surface of a membrane comprises:
  dipping a membrane in a conjugated polyelectrolyte (CPE) solution containing the conjugated polyelectrolyte (CPE) dissolved therein so that the surface of the membrane may be coated with the conjugated polyelectrolyte (CPE);
  drying the membrane coated with the conjugated polyelectrolyte (CPE), and
  the coating and drying are carried out once or repeated many times.

8. The method for manufacturing a conjugated polyelectrolyte-grafted membrane according to claim 5, wherein the step of substituting the halide ion of the conjugated polyelectrolyte (CPE) crosslinked to a surface of the membrane with a hydroxide ion ($OH^-$) is carried out by dipping the membrane to which the conjugated polyelectrolyte (CPE) is crosslinked in an alkaline solution so that a halide ion present in the side chain of the conjugated polyelectrolyte (CPE) is substituted with the hydroxide ion ($OH^-$).

9. The method for manufacturing a conjugated polyelectrolyte-grafted membrane according to claim 5, wherein the step of preparing a conjugated polyelectrolyte (CPE) comprises:
  preparing a conjugated polymer (CP) through crosslinking of an electron-donating monomer with an electron-accepting monomer; and
  introducing 1-vinylimidazole to a side chain of the conjugated polymer (CP) to obtain a conjugated polyelectrolyte (CPE).

* * * * *